(12) United States Patent
Noguchi

(10) Patent No.: US 12,508,003 B2
(45) Date of Patent: Dec. 30, 2025

(54) ULTRASOUND SYSTEM, ULTRASOUND PROBE, CONTROL METHOD OF ULTRASOUND SYSTEM, AND CONTROL METHOD OF ULTRASOUND PROBE

(71) Applicant: FUJIFILM Corporation, Tokyo (JP)

(72) Inventor: Masafumi Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 401 days.

(21) Appl. No.: 17/935,841

(22) Filed: Sep. 27, 2022

(65) Prior Publication Data

US 2023/0118210 A1    Apr. 20, 2023

(30) Foreign Application Priority Data

Oct. 15, 2021   (JP) .................. 2021-169469

(51) Int. Cl.
*A61B 8/00*    (2006.01)

(52) U.S. Cl.
CPC .............. *A61B 8/54* (2013.01); *A61B 8/4488* (2013.01); *A61B 8/464* (2013.01)

(58) Field of Classification Search
CPC ..... A61B 8/4411; A61B 8/4488; A61B 8/464; A61B 8/54; A61B 8/565; G01S 7/52034;
(Continued)

(56) References Cited

U.S. PATENT DOCUMENTS

2007/0024752 A1*  2/2007  Roush .............. H04N 5/94
                                                          348/565
2010/0298711 A1  11/2010  Pedersen et al.
(Continued)

FOREIGN PATENT DOCUMENTS

JP    2003-263420 A    9/2003
JP    2005-006887 A    1/2005
(Continued)

OTHER PUBLICATIONS

Yale, "How BIOS Works", 2006 (Year: 2006).*
(Continued)

*Primary Examiner* — Brooke Lyn Klein
(74) *Attorney, Agent, or Firm* — Studebaker Brackett PLLC

(57) ABSTRACT

Provided are an ultrasound system, an ultrasound probe, a control method of the ultrasound system, and a control method of the ultrasound probe. The ultrasound system includes a display terminal and an ultrasound probe. The ultrasound probe has a reception circuit that generates a sound ray signal from a reception signal output from an oscillator array, an image generation unit that generates ultrasound image data from the sound ray signal, and a data selection unit that selects one of the ultrasound image data and intermediate data generated in a middle of generating the ultrasound image data, according to computing power of the display terminal, as data to be output to the display terminal. The display terminal to which the intermediate data is input generates the ultrasound image data from the intermediate data and displays an ultrasound image based on the ultrasound image data on the monitor.

10 Claims, 12 Drawing Sheets

(58) Field of Classification Search
CPC . G01S 7/52053; G01S 7/5208; G01S 7/52082
See application file for complete search history.

(56) References Cited

U.S. PATENT DOCUMENTS

| | | |
|---|---|---|
| 2013/0226001 A1 | 8/2013 | Steen et al. |
| 2014/0347954 A1* | 11/2014 | Maurice ............... A61B 8/4411 367/7 |
| 2015/0065882 A1* | 3/2015 | Cho ......................... A61B 8/56 600/443 |
| 2016/0015368 A1 | 1/2016 | Poland |
| 2016/0066893 A1* | 3/2016 | Cho ......................... A61B 8/54 600/459 |
| 2016/0100824 A1 | 4/2016 | Kim |
| 2017/0354396 A1* | 12/2017 | Lee ....................... A61B 8/4477 |
| 2019/0025801 A1* | 1/2019 | Suzuki ............... G05B 19/4183 |
| 2019/0034156 A1* | 1/2019 | Kim ...................... H04M 1/725 |
| 2020/0275292 A1* | 8/2020 | Byeon .................. H04W 76/11 |

FOREIGN PATENT DOCUMENTS

| | | |
|---|---|---|
| JP | 2005-288157 A | 10/2005 |
| JP | 2012-245021 A | 12/2012 |
| JP | 2013-172959 A | 9/2013 |
| JP | 2015-500117 A | 1/2015 |
| JP | 2016-512446 A | 4/2016 |
| JP | 2016-519380 A | 6/2016 |
| JP | 2019-198457 A | 11/2019 |
| JP | 2020-101994 A | 7/2020 |

OTHER PUBLICATIONS

The extended European search report issued by the European Patent Office on Mar. 13, 2023, which corresponds to European Patent Application No. 22198251.5-1206 and is related to U.S. Appl. No. 17/935,841.

An Office Action; "Notice of Reasons for Refusal," mailed by the Japanese Patent Office on Mar. 11, 2025, which corresponds to Japanese Patent Application No. 2021-169469 and is related to U.S. Appl. No. 17/935,841; with English language translation.

* cited by examiner

ULTRASOUND SYSTEM, ULTRASOUND PROBE, CONTROL METHOD OF ULTRASOUND SYSTEM, AND CONTROL METHOD OF ULTRASOUND PROBE

CROSS-REFERENCE TO RELATED APPLICATIONS

This application claims priority under 35 U.S.C. § 119(a) to Japanese Patent Application No. 2021-169469 filed on Oct. 15, 2021. The above application is hereby expressly incorporated by reference, in its entirety, into the present application.

BACKGROUND OF THE INVENTION

1. Field of the Invention

The present invention relates to an ultrasound system including a plurality of types of display terminals, an ultrasound probe connectable to a plurality of types of display terminals, a control method of the ultrasound system, and a control method of the ultrasound probe.

2. Description of the Related Art

In recent years, an ultrasound system in which an ultrasound probe is connectable to a general-purpose display terminal such as a smartphone has been developed. In such an ultrasound system, in order to enable various types of display terminals to be connected to and used with the ultrasound probe regardless of computing power of the display terminal, ultrasound image data may be generated in the ultrasound probe and the generated ultrasound image data may be displayed on the display terminal, for example, as disclosed in JP2019-198457A.

SUMMARY OF THE INVENTION

As disclosed in JP2019-198457A, with the generation of the ultrasound image data in the ultrasound probe, there is no need to generate the ultrasound image data in the display terminal. Therefore, for example, an inexpensive display terminal having low computing power can be used as the display terminal connected to the ultrasound probe. However, in a case where advanced processing such as generation of high-definition ultrasound image data is performed in the ultrasound probe, there is a problem that power consumption of the ultrasound probe increases and a temperature inside the ultrasound probe rises due to heat generation. For this reason, in a case where a display terminal having high computing power is used, the advanced processing is desirable to be performed on the display terminal side instead of in the ultrasound probe.

The present invention has been made to solve such a problem in the related art, and an object of the present invention is to provide an ultrasound system, an ultrasound probe, a control method of the ultrasound system, and a control method of the ultrasound probe capable of using various types of display terminals and causing the display terminal to perform processing according to computing power of the display terminal to be used.

In order to achieve the object described above, an ultrasound system according to an aspect of the present invention comprises a plurality of types of display terminals each having a monitor, and an ultrasound probe connectable to any of the plurality of types of display terminals. The ultrasound probe includes an oscillator array, a transmission circuit that transmits an ultrasound wave from the oscillator array, a reception circuit that performs reception focus processing on a reception signal output from the oscillator array that has received an ultrasound echo to generate a sound ray signal, an image generation unit that generates ultrasound image data based on the sound ray signal, and a data selection unit that selects one of the ultrasound image data generated by the image generation unit or intermediate data generated by the reception circuit in a middle of generating the ultrasound image data from the reception signal, according to computing power of a display terminal connected to the ultrasound probe among the plurality of types of display terminals, as data to be output to the display terminal. The display terminal, which has received the ultrasound image data from the ultrasound probe, displays an ultrasound image based on the ultrasound image data on the monitor. The display terminal, which has received the intermediate data from the ultrasound probe, generates ultrasound image data from the intermediate data and displays an ultrasound image based on the ultrasound image data on the monitor.

The intermediate data may be the reception signal digitized by the reception circuit.

Further, the intermediate data may be the sound ray signal generated by the reception circuit.

Further, the intermediate data may be complex data after orthogonal detection generated by the reception circuit.

The ultrasound system may further comprise a down-sampling unit that changes the number of samples or a bit width of the intermediate data according to the computing power of the display terminal in a case where the ultrasound image data is output to the display terminal connected to the ultrasound probe.

In this case, the down-sampling unit may narrow the bit width of the intermediate data or reduce the number of samples of the intermediate data as the computing power of the display terminal is lower.

The ultrasound probe may have a computing power determination unit that determines the computing power of the display terminal connected to the ultrasound probe.

Alternatively, each of the plurality of types of display terminals may have a computing power determination unit that determines a computing power.

The computing power determination unit may determine the computing power based on a processing time of a test program in a case where the test program set in the display terminal is started.

Alternatively, the computing power determination unit may determine the computing power based on at least one of a model number or a memory amount of a central processing unit provided in the display terminal.

An ultrasound probe according to an aspect of the present invention is connectable to any of a plurality of types of display terminals. The ultrasound probe comprises an oscillator array, a transmission circuit that transmits an ultrasound wave from the oscillator array, a reception circuit that performs reception focus processing on a reception signal output from the oscillator array that has received an ultrasound echo to generate a sound ray signal, an image generation unit that generates ultrasound image data based on the sound ray signal, and a data selection unit that selects one of the ultrasound image data generated by the image generation unit or intermediate data generated by the reception circuit in a middle of generating the ultrasound image data from the reception signal, according to computing power of a display terminal connected to the ultrasound probe among the plurality of types of display terminals, as data to be output to the display terminal.

A control method of an ultrasound system according to an aspect of the present invention includes a plurality of types of display terminals each having a monitor and an ultrasound probe connectable to any of the plurality of types of display terminals. The control method comprises, in the ultrasound probe, transmitting an ultrasound wave from the oscillator array, performing reception focus processing on a reception signal output from the oscillator array that has received an ultrasound echo to generate a sound ray signal, generating ultrasound image data based on the sound ray signal, selecting one of the ultrasound image data or intermediate data generated in a middle of generating the ultrasound image data from the reception signal, according to computing power of a display terminal connected to the ultrasound probe among the plurality of types of display terminals, as data to be output to the display terminal, displaying an ultrasound image based on the ultrasound image data on a monitor in the display terminal, which has received the ultrasound image data from the ultrasound probe, and generating ultrasound image data from the intermediate data in the display terminal, which has received the intermediate data from the ultrasound probe, and displaying an ultrasound image based on the ultrasound image data on the monitor.

A control method of an ultrasound probe according to an aspect of the present invention is connectable to any of a plurality of types of display terminals. The control method comprises transmitting an ultrasound wave from the oscillator array, performing reception focus processing on a reception signal output from the oscillator array that has received an ultrasound echo to generate a sound ray signal, generating ultrasound image data based on the sound ray signal, and selecting one of the ultrasound image data or intermediate data generated in a middle of generating the ultrasound image data from the reception signal, according to computing power of a display terminal connected to the ultrasound probe among the plurality of types of display terminals, as data to be output to the display terminal.

According to an aspect of the present invention, the ultrasound system comprises the plurality of types of display terminals each having the monitor, and the ultrasound probe connectable to any of the plurality of types of display terminals. The ultrasound probe includes the oscillator array, the transmission circuit that transmits the ultrasound wave from the oscillator array, the reception circuit that performs the reception focus processing on the reception signal output from the oscillator array that has received the ultrasound echo to generate the sound ray signal, the image generation unit that generates the ultrasound image data based on the sound ray signal, and the data selection unit that selects one of the ultrasound image data generated by the image generation unit or the intermediate data generated by the reception circuit in the middle of generating the ultrasound image data from the reception signal, according to the computing power of the display terminal connected to the ultrasound probe among the plurality of types of display terminals, as the data to be output to the display terminal. The display terminal, which has received the ultrasound image data from the ultrasound probe, displays the ultrasound image based on the ultrasound image data on the monitor. The display terminal, which has received the intermediate data from the ultrasound probe, generates the ultrasound image data from the intermediate data and displays the ultrasound image based on the ultrasound image data on the monitor. Therefore, it is possible to use various types of display terminals and to cause the display terminal to perform the processing according to the computing power of the display terminal to be used.

DESCRIPTION OF THE PREFERRED EMBODIMENTS

Hereinafter, embodiments of the present invention will be described with reference to accompanying drawings.

The following description of configuration requirements is based on a representative embodiment of the present invention, but the present invention is not limited to such an embodiment.

In the present specification, a range of numerical values represented by using "to" means a range including numerical values described before and after "to" as a lower limit value and an upper limit value.

In the present specification, "identical" and "same" include an error range generally allowed in the technical field.

First Embodiment

Figure 1:
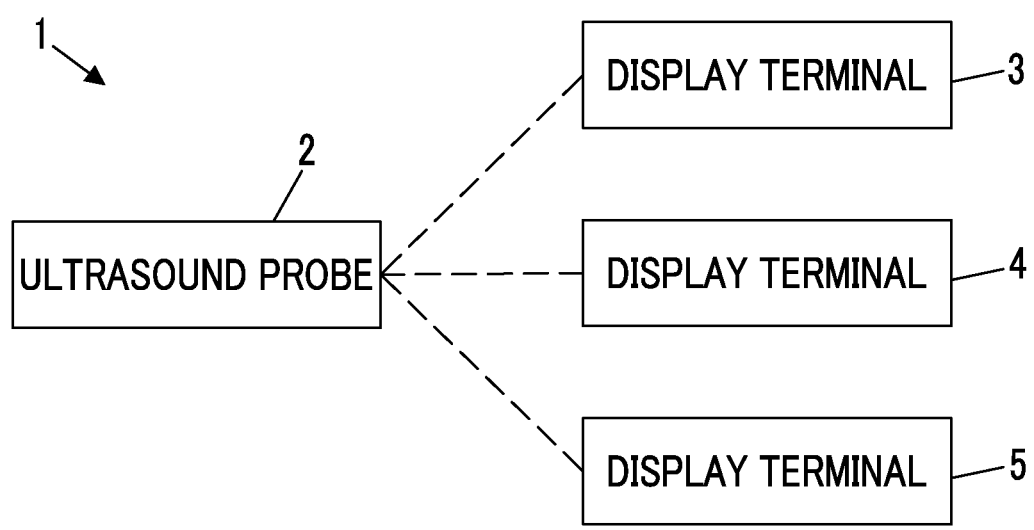
FIG. 1 is a block diagram showing a configuration of an ultrasound system according to a first embodiment of the present invention.

FIG. 1 shows a configuration of an ultrasound system 1 according to a first embodiment of the present invention. The ultrasound system 1 comprises an ultrasound probe 2 and display terminals 3, 4, and 5 connectable to the ultrasound probe 2. The display terminals 3, 4, and 5 have different computing power, but have an identical configuration. Hereinafter, an example will be described in which the display terminal 3 among the plurality of types of display terminals 3, 4, and 5 is connected to the ultrasound probe 2.

Figure 2:
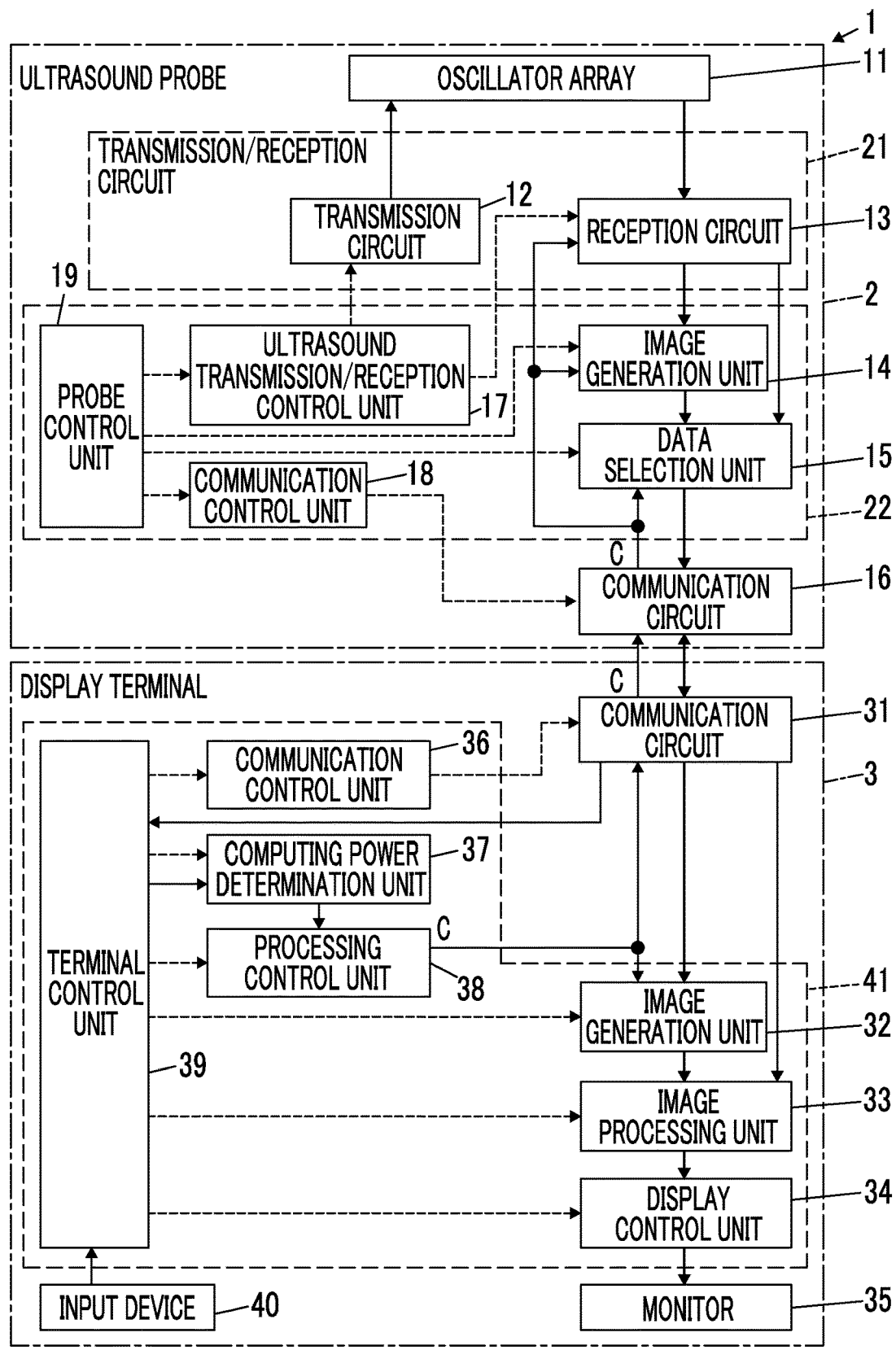
FIG. 2 is another block diagram showing in detail the configuration of the ultrasound system according to the first embodiment of the present invention.

As shown in FIG. 2, the ultrasound probe 2 comprises an oscillator array 11. A transmission circuit 12 is connected to the oscillator array 11. Further, a reception circuit 13 is connected to the oscillator array 11. An image generation unit 14 and a data selection unit 15 are connected to the reception circuit 13. Further, a communication circuit 16 is connected to the data selection unit 15. The communication circuit 16 is also connected to the reception circuit 13 and the image generation unit 14. Further, an ultrasound transmission/reception control unit 17 is connected to the transmission circuit 12 and the reception circuit 13. Further, a communication control unit 18 is connected to the communication circuit 16.

Further, a probe control unit 19 is connected to the image generation unit 14, the data selection unit 15, the ultrasound transmission/reception control unit 17, and the communication control unit 18.

A transmission/reception circuit 21 is configured by the transmission circuit 12 and the reception circuit 13. A processor 22 for the ultrasound probe 2 is configured by the image generation unit 14, the data selection unit 15, the ultrasound transmission/reception control unit 17, the communication control unit 18, and the probe control unit 19.

The display terminal 3 comprises a communication circuit 31 connected to the communication circuit 16 of the ultrasound probe 2. An image generation unit 32, an image processing unit 33, a display control unit 34, and a monitor 35 are sequentially connected to the communication circuit 31. Further, a communication control unit 36 is connected to the communication circuit 31. Further, the communication circuit 31 is also connected to the image processing unit 33. Further, the display terminal 3 comprises a computing power determination unit 37. A processing control unit 38 is connected to the computing power determination unit 37. The processing control unit 38 is connected to the communication circuit 31 and the image generation unit 32.

Further, a terminal control unit 39 is connected to the image generation unit 32, the image processing unit 33, the display control unit 34, the communication control unit 36, the computing power determination unit 37, and the processing control unit 38. Further, an input device 40 is connected to the terminal control unit 39. Further, the terminal control unit 39 is also connected to the communication circuit 31.

Further, a processor 41 for the display terminal 3 is configured by the image generation unit 32, the image processing unit 33, the display control unit 34, the communication control unit 36, the computing power determination unit 37, the processing control unit 38, and the terminal control unit 39.

The oscillator array 11 of the ultrasound probe 2 has a plurality of ultrasound oscillators arranged one-dimensionally or two-dimensionally. Each of these ultrasound oscillators transmits an ultrasound wave in accordance with a drive signal supplied from the transmission circuit 12, receives an ultrasound echo from a subject, and outputs a signal based on the ultrasound echo. Each ultrasound oscillator is configured by, for example, forming electrodes at both ends of a piezoelectric body made of a piezoelectric ceramic represented by lead zirconate titanate (PZT), a polymer piezoelectric element represented by poly vinylidene di fluoride (PVDF), a piezoelectric single crystal represented by lead magnesium niobate-lead titanate (PMN-PT), or the like.

The transmission circuit 12 includes, for example, a plurality of pulse generators and supplies respective drive signals to the plurality of ultrasound oscillators by adjusting a delay amount such that ultrasound waves transmitted from the plurality of ultrasound oscillators of the oscillator array 11 form an ultrasound beam based on a transmission delay pattern selected in accordance with an instruction from the ultrasound transmission/reception control unit 17. As described above, in a case where a pulse-like or continuous wave-like voltage is applied to the oscillator electrodes of the oscillator array 11, the piezoelectric body expands and contracts to generate pulse-like or continuous wave-like ultrasound waves from the respective oscillators and the ultrasound beam is formed from a combined wave of those ultrasound waves.

The transmitted ultrasound beam is reflected by, for example, a target such as a site of the subject and propagates toward the oscillator array 11. The ultrasound waves propagating toward the oscillator array 11 in this manner are received by the respective ultrasound oscillators constituting the oscillator array 11. In this case, the respective ultrasound oscillators constituting the oscillator array 11 expand and contract by receiving the propagating ultrasound echo to generate electric signals and output a reception signal which is these electric signals to the reception circuit 13.

Figure 3:
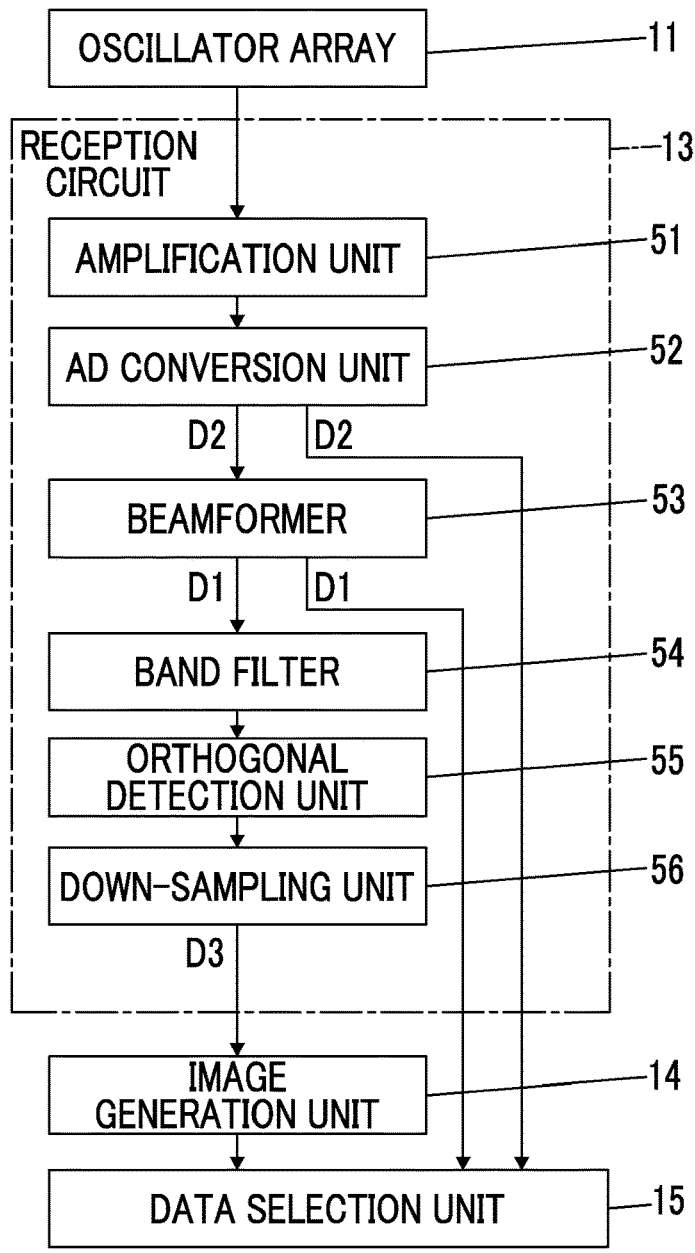
FIG. 3 is a block diagram showing a configuration of a reception circuit according to the first embodiment of the present invention.

The reception circuit 13 performs, in accordance with the instruction from the ultrasound transmission/reception control unit 17, reception focus processing on the reception signal output from the oscillator array 11 that has received the ultrasound echo to generate a sound ray signal. As shown in FIG. 3, the reception circuit 13 has a configuration in which an amplification unit 51, an analog to digital (AD) conversion unit 52, a beamformer 53, a band filter 54, an orthogonal detection unit 55, and a down-sampling unit 56 are connected in series. Further, the down-sampling unit 56 is connected to the image generation unit 14, and the AD conversion unit 52 and the beamformer 53 are connected to the data selection unit 15.

The amplification unit 51 amplifies the reception signal input from each of the oscillators constituting the oscillator array 11 and transmits the amplified reception signal to the AD conversion unit 52.

The AD conversion unit 52 converts the reception signal transmitted from the amplification unit 51 into digitized element data and transmits these pieces of element data to the beamformer 53.

The beamformer 53 performs the reception focus processing of providing a delay to each piece of element data according to a set sound velocity and performing addition (phasing addition), based on a reception delay pattern selected in accordance with the instruction from the ultrasound transmission/reception control unit 17. With this reception focus processing, the sound ray signal in which focus of the ultrasound echo is narrowed down is generated.

The band filter 54 removes, from the sound ray signal generated by the beamformer 53, a frequency component that may become noise in generating ultrasound image data, such as a frequency component derived from a motion of a body tissue of the subject. In the present invention, pieces of image data obtained by a so-called ultrasound examination such as so-called B-mode (Brightness mode) image data, color Doppler image data, and pulse Doppler image data are collectively referred to as the ultrasound image data.

The orthogonal detection unit 55 performs orthogonal detection by mixing a carrier signal having a reference frequency with the sound ray signal from which a component in a specific frequency band has been removed by the band filter 54 to convert the sound ray signal into complex data.

The down-sampling unit 56 changes the number of samples of intermediate data for generating the ultrasound image data according to the computing power of the display terminal 3 in accordance with a control signal C described below which is output from the processing control unit 38. In this case, the down-sampling unit 56 can change the number of samples of the intermediate data for generating the ultrasound image data such that the number of samples in the complex data by thinning out a large number of samples from the complex data is reduced as the computing power of the display terminal 3 is lower and the number of samples in the complex data is increased as the computing power of the display terminal 3 is higher.

In the present invention, the sound ray signal subjected to the reception focus processing, output from the beamformer 53, is referred to as first intermediate data D1, the digitized element data output from the AD conversion unit 52 is referred to as second intermediate data D2, and the complex data output from the down-sampling unit 56 is referred to as third intermediate data D3. The first intermediate data D1 and the second intermediate data D2 are transmitted to the data selection unit 15, and the third intermediate data D3 is transmitted to the image generation unit 14.

The ultrasound transmission/reception control unit 17 controls the transmission circuit 12 and the reception circuit 13 under an instruction of the probe control unit 19 to transmit the ultrasound beam from the oscillator array 11 and to receive the ultrasound echo by the oscillator array 11.

The image generation unit 14 of the ultrasound probe 2 generates the ultrasound image data based on the sound ray signal which is output by the reception circuit 13 and converted into the complex data. In the first embodiment, an example will be described in which the B-mode image data is generated as the ultrasound image data.

Figure 4:
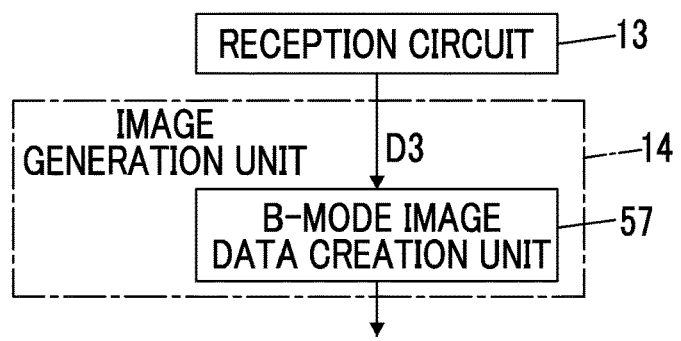
FIG. 4 is a block diagram showing a configuration of an image generation unit of an ultrasound probe according to the first embodiment of the present invention.

As shown in FIG. 4, the image generation unit 14 of the ultrasound probe 2 has a B-mode image data creation unit 57 that creates the B-mode image data based on the third intermediate data D3.

The B-mode image data creation unit 57 performs correction of attenuation depending on a distance according to a depth of a reflection position of the ultrasound wave and then performs envelope detection processing on the third intermediate data D3 to create the B-mode image data representing tomographic image information relating to a tissue in the subject.

The image generation unit 14 transmits the B-mode image data generated in this manner to the communication circuit 16.

The data selection unit 15 selects the ultrasound image data generated by the image generation unit 14 of the ultrasound probe 2 and one of the intermediate data D1 and the intermediate data D2, which are generated in the middle of generating the ultrasound image data from the reception signal by the reception circuit 13 and the image generation unit 14, as data to be output to the display terminal 3 according to the computing power of the display terminal 3 connected to the ultrasound probe 2 among the plurality of types of display terminals connectable to the ultrasound probe 2, in accordance with the control signal C described below which is output from the processing control unit 38.

In a case where the ultrasound image data is selected as the data to be output to the display terminal 3, the data selection unit 15 transmits the third intermediate data D3 to the image generation unit 14. Further, in a case where the first intermediate data D1 or the second intermediate data D2 is selected as the data to be output to the display terminal 3, the selected first intermediate data D1 or second intermediate data D2 is transmitted to the communication circuit 16.

The communication circuit 16 of the ultrasound probe 2 transmits the ultrasound image data generated by the image generation unit 14 and the first intermediate data D1 and second intermediate data D2 transmitted from the data selection unit 15 to the communication circuit 31 of the display terminal 3. Further, the communication circuit 16 receives the control signal C described below which is output by the processing control unit 38 from the communication circuit 31 of the display terminal 3 and transmits the control signal C to the reception circuit 13, the data selection unit 15, and the image generation unit 14.

The communication circuit 16 can perform so-called wired communication in a case of exchanging data with the communication circuit 31 of the display terminal 3, but can also perform so-called wireless communication. In particular, in a case where the data is transmitted to the communication circuit 31 by wireless communication, a transmission signal is generated by modulation of a carrier based on the data transmitted to the communication circuit 31, and the generated transmission signal is wirelessly transmitted to the communication circuit 31. For example, amplitude shift keying (ASK), phase shift keying (PSK), quadrature phase shift keying (QPSK), 16 quadrature amplitude modulation (16QAM), or the like is used as a carrier modulation method.

The communication control unit 18 of the ultrasound probe 2 controls the communication circuit 16 such that the data is transmitted to the communication circuit 31 of the display terminal 3 and the data is received from the communication circuit 31 under the instruction of the probe control unit 19.

The probe control unit 19 controls each unit of the ultrasound probe 2 based on a program or the like stored in advance.

The processor 22 including the image generation unit 14, the data selection unit 15, the ultrasound transmission/reception control unit 17, the communication control unit 18, and the probe control unit 19 is configured of a central processing unit (CPU) and a control program for causing the CPU to perform various pieces of processing, but may be configured by using a field programmable gate array (FPGA), a digital signal processor (DSP), an application specific integrated circuit (ASIC), a graphics processing unit (GPU), or another integrated circuit (IC), or may be configured by combining the above.

The image generation unit 14, the data selection unit 15, the ultrasound transmission/reception control unit 17, the communication control unit 18, and the probe control unit 19 of the processor 22 can be also configured to be partially or wholly integrated into one CPU or the like.

The communication circuit 31 of the display terminal 3 receives the ultrasound image data, the first intermediate data D1, and the second intermediate data D2 from the communication circuit 16 of the ultrasound probe 2. In this case, the ultrasound image data is transmitted to the image processing unit 33. Further, the first intermediate data D1 and the second intermediate data D2 are transmitted to the image generation unit 32. Further, the communication circuit 31 transmits the control signal C described below which is output by the processing control unit 38 to the communication circuit 16 of the ultrasound probe 2.

The communication circuit 31 of the display terminal 3 can perform so-called wired communication in a case of exchanging the data with the communication circuit 16 of the ultrasound probe 2, but can also perform so-called wireless communication. In particular, in a case where the data is transmitted to the communication circuit 16 by wireless communication, a transmission signal is generated by modulation of a carrier based on the data transmitted to the communication circuit 16 of the ultrasound probe 2, and the generated transmission signal is wirelessly transmitted to the communication circuit 16 of the ultrasound probe 2. For example, ASK, PSK, QPSK, 16QAM, or the like is used as the carrier modulation method.

The communication control unit 36 controls the communication circuit 31 such that the data is transmitted to the communication circuit 16 of the ultrasound probe 2 and the data is received from the communication circuit 16 of the ultrasound probe 2 under an instruction of the terminal control unit 39.

The image generation unit 32 of the display terminal 3 generates the ultrasound image data based on the first intermediate data D1 and the second intermediate data D2 received from the communication circuit 31. However, an example in which the B-mode image data is generated as the ultrasound image data will be described herein.

Figure 5:
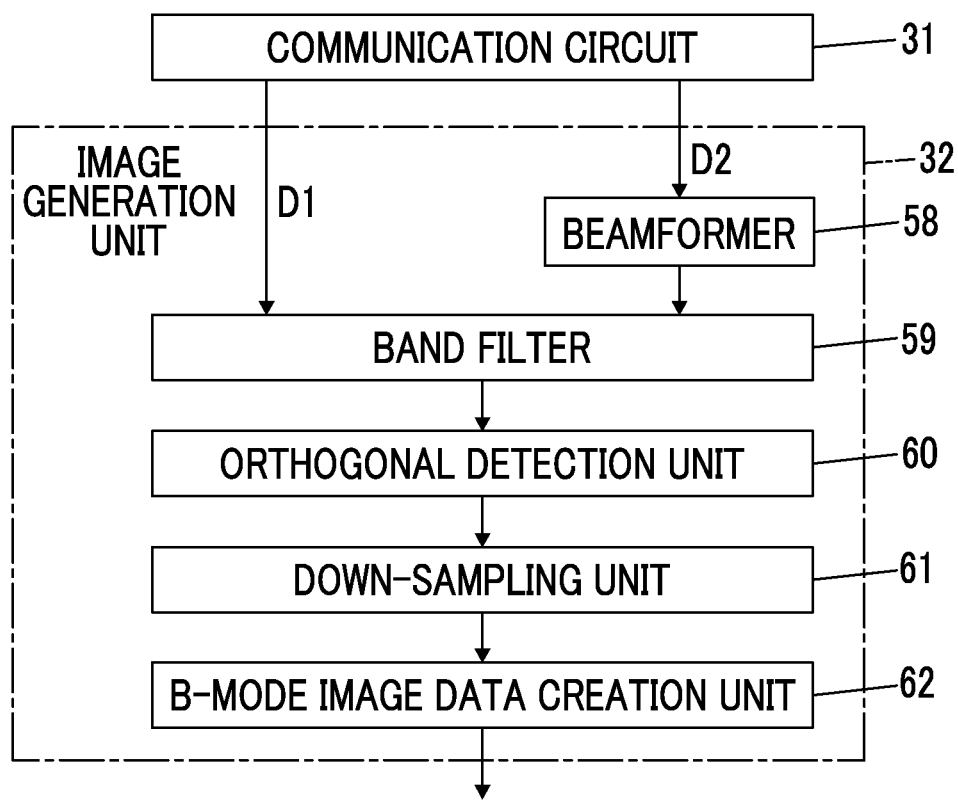
FIG. 5 is a block diagram showing a configuration of an image generation unit of a display terminal according to the first embodiment of the present invention.

As shown in FIG. 5, the image generation unit 32 has a configuration in which a beamformer 58, a band filter 59, an orthogonal detection unit 60, a down-sampling unit 61, and a B-mode image data creation unit 62 are connected in series. The orthogonal detection unit 60 and the down-sampling unit 61 are identical to the orthogonal detection unit 55 and the down-sampling unit 56 of the reception circuit 13 shown in FIG. 3, and the B-mode image data creation unit 62 is identical to the B-mode image data creation unit 57 of the image generation unit 14 of the sound wave probe 2 shown in FIG. 4. Further, the beamformer 58 and the band filter 59 are each connected to the communication circuit 31.

The band filter 59 of the image generation unit 32 may analyze the first intermediate data D1 to detect an echo signal of the tissue in the subject and remove the detected echo signal of the tissue from the first intermediate data D1. Accordingly, a signal-noise (S/N) ratio of the B-mode image data created by the B-mode image data creation unit 62 can be increased to achieve high definition.

The beamformer 58 of the image generation unit 32 can perform so-called parallel simultaneous beam forming or so-called aperture synthesis processing on the second intermediate data D2. Accordingly, the S/N ratio of the B-mode image data created by the B-mode image data creation unit 62 can be increased to achieve high definition.

The first intermediate data D1 is transmitted from the communication circuit 31 to the band filter 59. The first intermediate data D1 is processed by the band filter 59, the orthogonal detection unit 60, the down-sampling unit 61, and the B-mode image data creation unit 62 to generate the B-mode image data.

Further, the second intermediate data D2 is transmitted from the communication circuit 31 to the beamformer 58. The second intermediate data D2 is processed by the beamformer 58, the band filter 59, the orthogonal detection unit 60, the down-sampling unit 61, and the B-mode image data creation unit 62 to generate the B-mode image data.

The image processing unit 33 converts (raster conversion) the ultrasound image data transmitted from the communication circuit 31 and the image generation unit 32 into an image signal according to a scanning method of a normal television signal, performs various types of necessary image processing such as gradation processing on the converted ultrasound image data, and then transmits the ultrasound image data to the display control unit 34.

Under the control of the terminal control unit 39, the display control unit 34 performs predetermined processing on the ultrasound image data that has been subjected to various types of processing by the image processing unit 33 to display an ultrasound image based on the ultrasound image data on the monitor 35.

The monitor 35 performs various displays under the control of the display control unit 34. The monitor 35 includes, for example, a display device such as a liquid crystal display (LCD) or an organic electroluminescence display (OED).

The computing power determination unit 37 determines the computing power of the display terminal 3. In this case, the computing power determination unit 37 can classify the computing power of the display terminal 3 into a plurality of grades, such as low computing power, high computing power, and ultra-high computing power.

In a case where the computing power of the display terminal 3 is determined, the computing power determination unit 37 stores, for example, a predetermined test program for determining the computing power of the display terminal 3 and can determine the computing power based on a processing time of the test program in a case where the test program is started by the display terminal 3. In this case, the computing power determination unit 37 can determine that the computing power of the display terminal 3 is lower as the processing time is longer and the computing power of the display terminal 3 is higher as the processing time is shorter.

For example, the computing power determination unit 37 has a first processing time threshold value and a second processing time threshold value that is shorter than the first processing time threshold value. The computing power determination unit 37 classifies the computing power of the display terminal 3 into the low computing power in a case where the processing time is longer than the first processing time threshold value, classifies the computing power of the display terminal 3 into the high computing power in a case where the processing time is equal to or larger than the second processing time threshold value and equal to or less than the first processing time threshold value, and classifies the computing power of the display terminal 3 into the ultra-high computing power in a case where the processing time is shorter than the second processing time threshold value.

For example, the computing power determination unit 37 can acquire information about an actual processing time in each unit of the ultrasound probe 2 from the ultrasound probe 2 via the communication circuit 31 and the terminal control unit 39 and set the first processing time threshold value and the second processing time threshold value based on the actual processing time in each unit of the ultrasound probe 2.

For example, the computing power determination unit 37 can set the actual processing time required for a series of processing in the band filter 54, the orthogonal detection unit 55, and the down-sampling unit 56 of the reception circuit 13 and the image generation unit 14 as the first processing time threshold value. Further, the computing power determination unit 37 can also set a time of one-tenth to a fraction of the actual processing time in the beamformer 53 of the reception circuit 13 as the first processing time threshold value. Further, the computing power determination unit 37 can also set the first processing time threshold value to $\frac{1}{60}$ second or the like as a processing time to the extent that a delay does not occur with respect to a scan rate of the ultrasound wave transmitted from the oscillator array 11.

In a case where the first processing time threshold value is set in this manner, the computing power determination unit 37 can set, for example, a value obtained by multiplying the first processing time threshold value by a constant ratio smaller than 1 as the second processing time threshold value.

For example, the computing power determination unit 37 can also store in advance a relationship between model numbers of a plurality of central processing units and the computing power and determine the computing power of the display terminal 3 based on the model number of the central processing unit provided in the display terminal 3.

Further, the computing power determination unit 37 can also determine the computing power of the display terminal 3 based on a memory amount of the display terminal 3. In this case, the computing power determination unit 37 can determine, for example, that the computing power of the display terminal 3 is lower as the memory amount is smaller and the computing power of the display terminal 3 is higher as the memory amount is larger.

For example, the computing power determination unit 37 has a first memory amount threshold value and a second memory amount threshold value that is larger than the first memory amount threshold value. The computing power determination unit 37 classifies the computing power of the display terminal 3 into the low computing power in a case where the memory amount is smaller than the first memory amount threshold value, classifies the computing power of the display terminal 3 into the high computing power in a case where the memory amount is equal to or larger than the first memory amount threshold value and equal to or less than the second memory amount threshold value, and classifies the computing power of the display terminal 3 into the ultra-high computing power in a case where the memory amount is larger than the second memory amount threshold value.

The processing control unit 38 generates the control signal C for controlling the reception circuit 13, the data selection unit 15, and the image generation unit 14 of the ultrasound probe 2 and the image generation unit 32 of the display terminal 3 based on the computing power of the display terminal 3 determined by the computing power determination unit 37 and outputs the generated the control signal C to the communication circuit 31 and the image generation unit 32.

For example, in a case where the computing power determination unit 37 determines that the computing power of the display terminal 3 is the low computing power among the low computing power, the high computing power, and the ultra-high computing power, the processing control unit 38 can generate the control signal C indicating that the ultrasound image data is generated in the ultrasound probe 2. In this case, for example, the data selection unit 15 selects the ultrasound image data as the data to be output to the display terminal 3 based on the control signal C and transmits the ultrasound image data generated by the image generation unit 14 of the ultrasound probe 2 to the communication circuit 16.

For example, in a case where the computing power determination unit 37 determines that the computing power of the display terminal 3 is the high computing power among the low computing power, the high computing power, and the ultra-high computing power, the processing control unit 38 can generate the control signal C indicating that up to the first intermediate data D1 is generated in the ultrasound probe 2 and the ultrasound image data is generated in the display terminal 3. In this case, for example, the data selection unit 15 selects the first intermediate data D1 as the data to be output to the display terminal 3 based on the control signal C and transmits the first intermediate data D1 generated by the reception circuit 13 to the communication circuit 16.

For example, in a case where the computing power determination unit 37 determines that the computing power of the display terminal 3 is the ultra-high computing power among the low computing power, the high computing power, and the ultra-high computing power, the processing control unit 38 can generate the control signal C indicating that up to the second intermediate data D2 is generated in the ultrasound probe 2 and the ultrasound image data is generated in the display terminal 3. In this case, for example, the data selection unit 15 selects the second intermediate data D2 as the data to be output to the display terminal 3 based on the control signal C and transmits the second intermediate data D2 generated by the reception circuit 13 to the communication circuit 16.

In general, in an ultrasound system having an ultrasound probe capable of generating the ultrasound image data, there is no need to generate the ultrasound image data in a display terminal connected to the ultrasound probe. Therefore, for example, an inexpensive display terminal having low computing power can be used as the display terminal connected to the ultrasound probe. However, in a case where the advanced processing such as generation of high-definition ultrasound image data or generation of ultrasound image data that requires phase information is performed in the ultrasound probe, there is a problem that power consumption of the ultrasound probe increases and a temperature inside the ultrasound probe rises due to heat generation. For this reason, in a case where a display terminal having high computing power is used, the advanced processing is desirable to be performed on the display terminal side instead of in the ultrasound probe.

In the ultrasound system 1, in a case where the computing power determination unit 37 determines that the computing power of the display terminal 3 is, for example, the high computing power or the ultra-high computing power, the data selection unit 15 outputs the first intermediate data D1 or the second intermediate data D2 to the display terminal 3 based on the control signal C output from the processing control unit 38. Therefore, it is possible to use various types of display terminals and to cause the display terminal 3 to perform the processing according to the computing power of the used display terminal 3.

The input device 40 is for a user of the ultrasound system 1 to perform an input operation. The input device 40 is configured of, for example, a device such as a keyboard, a mouse, a track ball, a button, a switch, a touch pad, or a touch panel for the user to perform the input operation.

The terminal control unit 39 controls each unit of the display terminal 3 according to a program or the like recorded in advance.

The processor 41 having the image generation unit 32, the image processing unit 33, the display control unit 34, the communication control unit 36, the computing power determination unit 37, the processing control unit 38, and the terminal control unit 39 is configured of a CPU and a control program for causing the CPU to perform various types of processing, but may be configured by using an FPGA, a DSP, an ASIC, a GPU, or another IC, or may be configured by combining the above.

The image generation unit 32, the image processing unit 33, the display control unit 34, the communication control unit 36, the computing power determination unit 37, the processing control unit 38, and the terminal control unit 39 of the processor 41 of the display terminal 3 can be also configured to be partially or wholly integrated into one CPU or the like.

Next, an operation of the ultrasound system 1 according to the first embodiment will be described with reference to a flowchart of FIG. 6. In the following description of the operation, an example will be described in which the B-mode image data is generated as the ultrasound image data and the computing power determination unit 37 classifies the computing power of the display terminal 3 into any one of the low computing power, the high computing power, or the ultra-high computing power.

In step S1, the computing power determination unit 37 determines the computing power of the display terminal 3 to classify the computing power thereof into any one of the low computing power, the high computing power, or the ultra-high computing power.

In a case where the computing power of the display terminal 3 is determined, the computing power determination unit 37 stores, for example, the predetermined test program for determining the computing power of the display terminal 3 and can determine the computing power based on the processing time of the test program in a case where the test program is started by the display terminal 3. In this case, the computing power determination unit 37 can determine that the computing power of the display terminal 3 is lower as the processing time is longer and the computing power of the display terminal 3 is higher as the processing time is shorter.

For example, the computing power determination unit 37 has the first processing time threshold value and the second processing time threshold value that is shorter than the first processing time threshold value. The computing power determination unit 37 classifies the computing power of the display terminal 3 into the low computing power in a case where the processing time is longer than the first processing time threshold value, classifies the computing power of the display terminal 3 into the high computing power in a case where the processing time is equal to or larger than the second processing time threshold value and equal to or less than the first processing time threshold value, and classifies the computing power of the display terminal 3 into the ultra-high computing power in a case where the processing time is shorter than the second processing time threshold value.

For example, the computing power determination unit 37 can also store in advance the relationship between model numbers of the plurality of central processing units and the computing power and determine the computing power of the display terminal 3 based on the model number of the central processing unit provided in the display terminal 3.

Further, the computing power determination unit 37 can also determine the computing power of the display terminal 3 based on the memory amount of the display terminal 3. In this case, the computing power determination unit 37 can determine, for example, that the computing power of the display terminal 3 is lower as the memory amount is smaller and the computing power of the display terminal 3 is higher as the memory amount is larger.

For example, the computing power determination unit 37 has the first memory amount threshold value and the second memory amount threshold value that is larger than the first memory amount threshold value. The computing power determination unit 37 classifies the computing power of the display terminal 3 into the low computing power in a case where the memory amount is smaller than the first memory amount threshold value, classifies the computing power of the display terminal 3 into the high computing power in a case where the memory amount is equal to or larger than the first memory amount threshold value and equal to or less than the second memory amount threshold value, and classifies the computing power of the display terminal 3 into the ultra-high computing power in a case where the memory amount is larger than the second memory amount threshold value.

In this manner, in a case where the computing power of the display terminal 3 is determined by the computing power determination unit 37, the processing control unit 38 generates the control signal C based on the determination result.

In a case where the computing power determination unit 37 determines that the computing power of the display terminal 3 is the low computing power, the processing control unit 38 generates the control signal C indicating that the ultrasound image data is generated in the ultrasound probe 2.

In a case where the computing power determination unit 37 determines that the computing power of the display terminal 3 is the high computing power, the processing control unit 38 generates the control signal C indicating that the first intermediate data D1 is generated in the ultrasound probe 2 and the ultrasound image data is generated in the display terminal 3 based on the first intermediate data D1.

In a case where the computing power determination unit 37 determines that the computing power of the display terminal 3 is the ultra-high computing power, the processing control unit 38 generates the control signal C indicating that the second intermediate data D2 is generated in the ultrasound probe 2 and the ultrasound image data is generated in the display terminal 3 based on the second intermediate data D2.

The control signal C generated by the processing control unit 38 in this manner is transmitted to the data selection unit 15 via the communication circuit 31 of the display terminal 3 and the communication circuit 16 of the ultrasound probe 2. Further, the control signal C is transmitted to the image generation unit 32 of the display terminal 3.

Next, in step S2, the inside of the subject is scanned by the oscillator array 11 in a state where the user brings the ultrasound probe 2 into contact with a body surface of the subject, and the B-mode image data representing tomographic information in the subject is generated in the ultrasound probe 2 as the ultrasound image data.

In this case, the ultrasound beam is transmitted into the subject from the plurality of ultrasound oscillators of the oscillator array 11 in accordance with the drive signal from the transmission circuit 12, and the reception signal is transmitted from each oscillator that has received the ultrasound echo from the subject to the amplification unit 51 of the reception circuit 13. Thereafter, the reception signal amplified by the amplification unit 51 is converted from an analog format to a digital format by the AD conversion unit 52 to generate the second intermediate data D2. Further, the second intermediate data D2 is subjected to the phasing addition by the beamformer 53 to generate the first intermediate data D1. The band filter 54 removes a frequency component of a predetermined band in the first intermediate data D1, the orthogonal detection unit 55 converts the first intermediate data D1 into the complex data, and the down-sampling unit 56 thins the number of samples out from the complex data according to the computing power of the display terminal 3 to generate the third intermediate data D3.

With the thinning out of the number of samples from the complex data by the down-sampling unit 56, it is possible to reduce a calculation load in a case where the ultrasound image data is subsequently generated in the image generation unit 14 of the ultrasound probe 2 and thus to suppress the power consumption in the ultrasound probe 2. In step S3, in order to reduce the calculation load in a case where the ultrasound image data is generated in the ultrasound probe 2, for example, the down-sampling unit 56 of the reception circuit 13 can perform the thinning out such that the number of samples included in the complex data is finally a constant number of samples such as 500 or 250. A sample thinning-out rate in the down-sampling unit 56 is decided by a sampling rate, an observation depth, and the number of samples after thinning out in the AD conversion unit 52. For example, in a case where the sampling rate in the AD conversion unit 52 is 40 MHz, the observation depth is about 3 cm, and the number of samples after thinning out is finally 500, the thinning-out rate is about ⅓. For example, in a case where the sampling rate in the AD conversion unit 52 is 40 MHz, the observation depth is about 3 cm, and the number of samples after thinning out is finally 250, the thinning-out rate is about ⅙.

The first intermediate data D1 and the second intermediate data D2 generated by the reception circuit 13 in this manner are transmitted to the data selection unit 15, and the third intermediate data D3 is transmitted to the image generation unit 14.

The B-mode image data creation unit 57 of the image generation unit 14 of the ultrasound probe 2 performs the correction of attenuation depending on the distance according to the depth of the reflection position of the ultrasound wave and then performs the envelope detection processing on the third intermediate data D3 to create the B-mode image data representing tomographic image information relating to the tissue in the subject as the ultrasound image data. The B-mode image data generated in this manner is transmitted to the data selection unit 15.

Accordingly, the processing of step S2 is completed.

In a subsequent step S3, the data selection unit 15 selects the data to be output to the display terminal 3 among the ultrasound image data generated by the image generation unit 14 of the ultrasound probe 2 and the first intermediate data D1 and the second intermediate data D2 generated in the reception circuit 13 according to the computing power of the display terminal 3, in accordance with the control signal C generated in step S1.

In a case where determination is made in step S1 that the computing power of the display terminal 3 is the low computing power, the data selection unit 15 selects the ultrasound image data as the data to be output to the display terminal 3 in step S3. In this case, the processing proceeds to step S4.

In step S4, the data selection unit 15 transmits the ultrasound image data generated in step S2 from the communication circuit 16 of the ultrasound probe 2 to the communication circuit 31 of the display terminal 3 to output the ultrasound image data to the display terminal 3.

In step S5, the ultrasound image data received by the communication circuit 31 of the display terminal 3 is subjected to the predetermined processing by the image processing unit 33 and the display control unit 34, and then the ultrasound image based on the ultrasound image data is displayed on the monitor 35.

In a case where determination is made in step S1 that the computing power of the display terminal 3 is the high computing power, the data selection unit 15 selects the first intermediate data D1 as the data to be output to the display terminal 3 in step S3. In this case, the processing proceeds to step S6.

In step S6, the data selection unit 15 transmits the first intermediate data D1 generated in step S2 from the communication circuit 16 of the ultrasound probe 2 to the communication circuit 31 of the display terminal 3 to output the first intermediate data D1 to the display terminal 3.

Next, in step S7, the ultrasound image data is generated in the display terminal 3. In this case, the image generation unit 32 of the display terminal 3 generates the ultrasound image data (B-mode image data) based on the first intermediate data D1 with the band filter 59, the orthogonal detection unit 60, the down-sampling unit 61, and the B-mode image data creation unit 62, in accordance with the control signal C output from the processing control unit 38.

In this case, the band filter 59 may analyze the first intermediate data D1 to detect the echo signal of the tissue in the subject and remove the detected echo signal of the tissue from the first intermediate data D1. Accordingly, the S/N ratio of the B-mode image data created by the B-mode image data creation unit 62 can be increased to achieve high definition.

With the thinning out of the number of samples from the complex data according to the computing power of the display terminal 3 by the down-sampling unit 61 in accordance with the control signal C, the calculation load in a case where the ultrasound image data is generated in the display terminal 3 is reduced. In a case where the calculation load on the display terminal 3 is large, for example, a time required for the display terminal 3 to generate the ultrasound image data becomes long, thus the display of the ultrasound image on the monitor 35 can no longer catch up with actual scanning by the oscillator array 11, and a problem such as inability to examine the subject smoothly may occur. However, with the thinning out of the number of samples from the complex data by the down-sampling unit 61, the display of the ultrasound image on the monitor 35 can catch up with the actual scanning by the oscillator array 11, and thus such a problem can be prevented.

In step S7, in order to reduce the calculation load on the display terminal 3, for example, the down-sampling unit 61 can perform the thinning out such that the number of samples included in the complex data is finally a constant number of samples such as 500 or 250, as in the down-sampling unit 56 of the reception circuit 13.

In a subsequent step S5, the ultrasound image data generated by the image generation unit 32 of the display terminal 3 is subjected to the predetermined processing by the image processing unit 33 and the display control unit 34, and then the ultrasound image based on the ultrasound image data is displayed on the monitor 35.

In a case where determination is made in step S1 that the computing power of the display terminal 3 is the ultra-high computing power, the data selection unit 15 selects the second intermediate data D2 as the data to be output to the display terminal 3 in step S2. In this case, the processing proceeds to step S8.

In step S8, the data selection unit 15 transmits the second intermediate data D2 generated in step S2 from the communication circuit 16 of the ultrasound probe 2 to the communication circuit 31 of the display terminal 3 to output the second intermediate data D2 to the display terminal 3.

Next, in step S7, the ultrasound image data is generated in the display terminal 3. In this case, the image generation unit 32 of the display terminal 3 generates the ultrasound image data (B-mode image data) based on the second intermediate data D2 by the beamformer 58, the band filter 59, the orthogonal detection unit 60, the down-sampling unit 61, and the B-mode image data creation unit 62, in accordance with the control signal C output from the processing control unit 38.

In this case, the beamformer 58 can perform the parallel simultaneous beam forming or the aperture synthesis processing on the second intermediate data D2. Accordingly, the S/N ratio of the B-mode image data created by the B-mode image data creation unit 62 can be increased to achieve high definition.

The band filter 59 may analyze the first intermediate data D1 to detect the echo signal of the tissue in the subject and remove the detected echo signal of the tissue from the first intermediate data D1. Accordingly, the S/N ratio of the B-mode image data created by the B-mode image data creation unit 62 can be increased to achieve high definition.

With the thinning out of the number of samples from the complex data according to the computing power of the display terminal 3 by the down-sampling unit 61 in accordance with the control signal C, the calculation load in a case where the ultrasound image data is generated in the display terminal 3 is reduced.

Here, since the computing power of the display terminal 3 is determined to be the ultra-high computing power, the computing power of the display terminal 3 is higher than that in the case where the computing power of the display terminal 3 is determined to be the high computing power. Therefore, the time required to generate the ultrasound image data is also considered to be short. Therefore, in a case where the computing power of the display terminal 3 is determined to be the ultra-high computing power, the number of thinned-out samples by the down-sampling unit 61 may be small, as compared with the case where the computing power of the display terminal 3 is determined to be the high computing power. In this case, in order to reduce the calculation load on the display terminal 3, the down-sampling unit 61 can perform the thinning out such that the final number of samples is reduced to a constant number of samples such as 500 or 250, as compared with the case where the computing power of the display terminal 3 is determined to be the high computing power.

In a subsequent step S5, the ultrasound image data generated by the image generation unit 32 of the display terminal 3 is subjected to the predetermined processing by the image processing unit 33 and the display control unit 34, and then the ultrasound image based on the ultrasound image data is displayed on the monitor 35.

Figure 6:
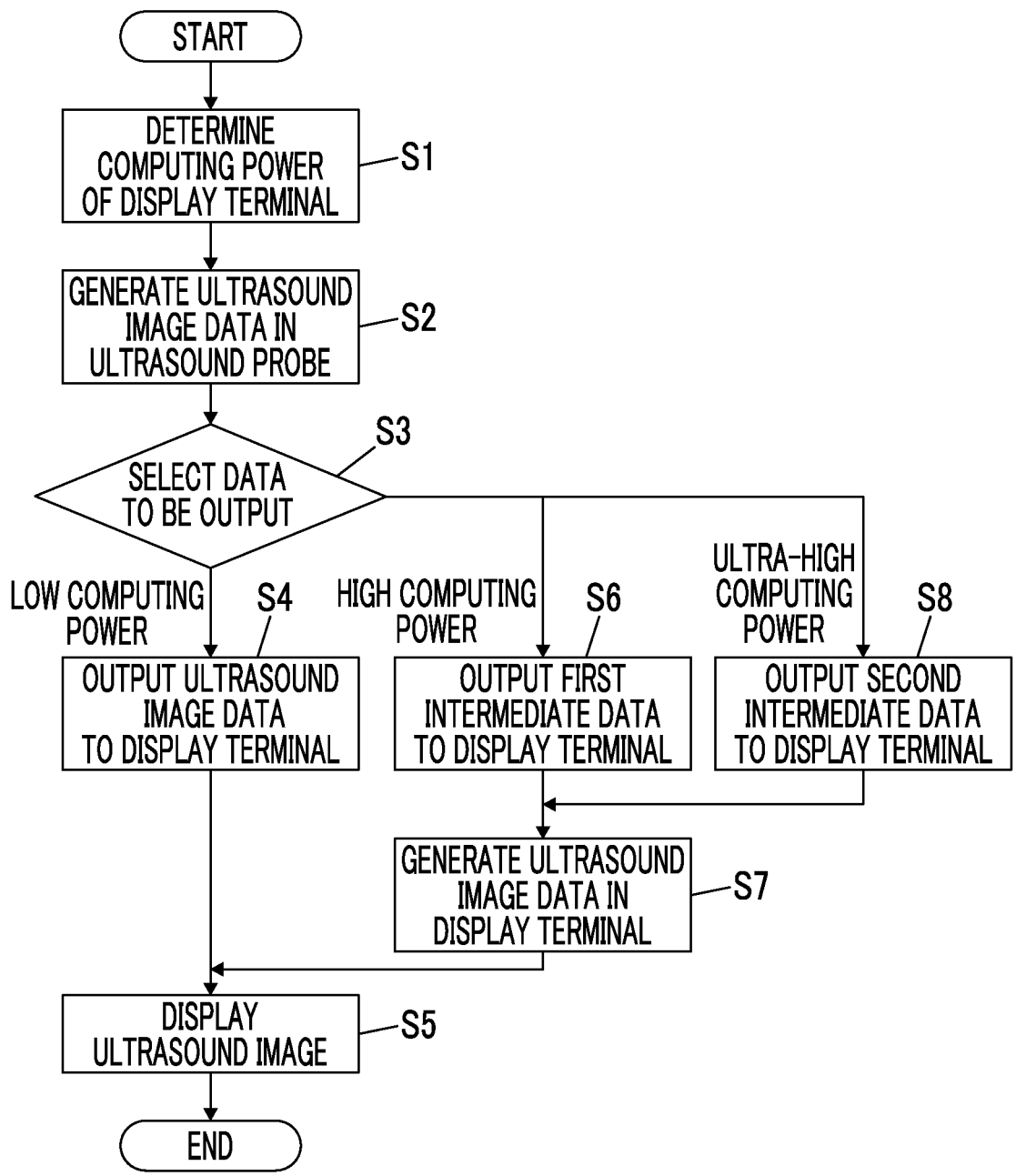
FIG. 6 is a flowchart showing an operation of the ultrasound system according to the first embodiment of the present invention.

In a case where the processing of step S5 is completed in this manner, the operation of the ultrasound system 1 of the first embodiment according to the flowchart of FIG. 6 ends.

As described above, with the ultrasound system 1 according to the first embodiment of the present invention, in a case where the computing power determination unit 37 determines that the computing power of the display terminal 3 is, for example, the high computing power or the ultra-high computing power, the data selection unit 15 outputs the first intermediate data D1 or the second intermediate data D2 to the display terminal 3 based on the control signal C output from the processing control unit 38. Therefore, it is possible to use various types of display terminals and to cause the display terminal 3 to perform the processing according to the computing power of the display terminal 3 connected to the ultrasound probe 2.

In particular, in a case where the display terminal 3 connected to the ultrasound probe 2 has the high computing power, the advanced processing such as definition improvement of the ultrasound image data can be performed on the D1 or the second intermediate data D2 in the display terminal 3 to generate the ultrasound image data in the display terminal 3.

It is described that the display terminals 3, 4, and 5 in the ultrasound system 1 have the identical configuration. However, the display terminals 3, 4, and 5 may have different configurations according to the computing power thereof. For example, the display terminal 3 may have the ultra-high computing power, the display terminal 4 may have the high computing power, and the display terminal 5 may have the low computing power.

In this case, the display terminal 3 having the ultra-high computing power can have the configuration shown in FIG. 2. The data selection unit 15 selects the second intermediate data D2 as the data to be output to the display terminal 3 and outputs the second intermediate data D2 from the communication circuit 16 of the ultrasound probe 2 to the communication circuit 31 of the display terminal 3. In the display terminal 3, the beamformer 58, the band filter 59, the orthogonal detection unit 60, the down-sampling unit 61, and the B-mode image data creation unit 62 of the image generation unit 32 generate the ultrasound image data based on the second intermediate data D2. The image processing unit 33 and the display control unit 34 perform the predetermined processing on the ultrasound image data, and the ultrasound image corresponding to the ultrasound image data is displayed on the monitor 35.

In the configuration of the display terminal 3 shown in FIG. 2, the display terminal 4 having the high computing power can have a configuration in which the beamformer 58 is removed from the image generation unit 32 instead of comprising the image generation unit 32 shown in FIG. 5. The data selection unit 15 selects the first intermediate data D1 as the data to be output to the display terminal 4 and outputs the first intermediate data D1 from the communication circuit 16 of the ultrasound probe 2 to the communication circuit 31 of the display terminal 4. In the display terminal 4, the band filter 59, the orthogonal detection unit 60, the down-sampling unit 61, and the B-mode image data creation unit 62 of the image generation unit 32 generate the ultrasound image data based on the first intermediate data D1. The image processing unit 33 and the display control unit 34 perform the predetermined processing on the ultrasound image data, and the ultrasound image corresponding to the ultrasound image data is displayed on the monitor 35.

In the configuration of the display terminal 3 shown in FIG. 2, the display terminal 5 having the low computing power can have a configuration excluding the image generation unit 32. The data selection unit 15 selects the ultrasound image data as the data to be output to the display terminal 5 and outputs the ultrasound image data from the communication circuit 16 of the ultrasound probe 2 to the communication circuit 31 of the display terminal 5. In the display terminal 5, the image processing unit 33 and the display control unit 34 perform the predetermined processing on the ultrasound image data output from the ultrasound probe 2, and the ultrasound image corresponding to the ultrasound image data is displayed on the monitor 35.

As described above, even in a case where the display terminals 3, 4, and 5 have different configurations according to the computing power thereof, the data selection unit 15 selects the data to be output to the display terminal 3, 4, or 5 connected to the ultrasound probe 2 according to the computing power of the display terminal 3, 4, or 5 connected to the ultrasound probe 2, as in the case where the display terminals 3, 4, and 5 have the identical configuration. Therefore, it is possible to use various types of display terminals and to cause the display terminal 3 to perform the processing according to the computing power of the display terminal 3 connected to the ultrasound probe 2.

Although FIG. 1 shows an example in which the ultrasound system 1 comprises three display terminals 3, 4, and 5 connectable to the ultrasound probe 2, the number of display terminals provided in the ultrasound system 1 and connectable to the ultrasound probe 2 is not particularly limited thereto. The ultrasound system 1 can also comprise, for example, two display terminals connectable to the ultrasound probe 2 or can also comprise four or more display terminals.

It is described that the computing power determination unit 37 determines the computing power of the display terminal 3 based on the model number of the central processing unit provided in the display terminal 3 and determines the computing power of the display terminal 3 based on the memory amount of the display terminal 3. However, the computing power determination unit 37 can also determine the computing power by combining these methods.

Further, it is described that the first intermediate data D1 and the second intermediate data D2 generated by the reception circuit 13 are transmitted to the data selection unit 15 and the third intermediate data D3 is transmitted to the image generation unit 14. However, the reception circuit 13 can also transmit only data necessary for subsequent processing among the first intermediate data D1, the second intermediate data D2, and the third intermediate data D3 to the data selection unit 15 or the image generation unit 14, based on the control signal C output by the processing control unit 38.

For example, in a case where the computing power determination unit 37 determines that the computing power of the display terminal 3 is the low computing power, the reception circuit 13 can transmit the third intermediate data D3 to the image generation unit 14 without transmitting the first intermediate data D1 and the second intermediate data D2 to the data selection unit 15.

In a case in which the computing power determination unit 37 determines that the computing power of the display terminal 3 is the high computing power, the reception circuit 13 can stop the processing until the first intermediate data D1 is generated and transmit only the first intermediate data D1 to the data selection unit 15 without transmitting the second intermediate data D2 to the data selection unit 15.

In a case in which the computing power determination unit 37 determines that the computing power of the display terminal 3 is the ultra-high computing power, the reception circuit 13 can stop the processing until the second intermediate data D2 is generated and transmit the second intermediate data D2 to the data selection unit 15.

As described above, the reception circuit 13 generates only the data necessary for the subsequent processing and transmits the generated data to the data selection unit 15 based on the control signal C output by the processing control unit 38. With the above, it is possible to omit an unnecessary calculation in the ultrasound probe 2 and to reduce the power consumption in the ultrasound probe 2.

It is described that the data selection unit 15 selects any one of the ultrasound image data, the first intermediate data D1, or the second intermediate data D2 as the data to be output to the display terminal 3. However, the selection unit 15 can also select the third intermediate data D3 as the data to be output to the display terminal 3. In this case, the third intermediate data D3 is transmitted from the communication circuit 16 of the ultrasound probe 2 to the communication circuit 31 of the display terminal 3, the B-mode image data creation unit 62 of the image generation unit 32 generates the ultrasound image data based on the third intermediate data D3, the image processing unit 33 and the display control unit 34 perform the predetermined processing on the ultrasound image data, and the ultrasound image corresponding to the ultrasound image data is displayed on the monitor 35. In this case as well, it is possible to perform the advanced processing such as definition improvement of the ultrasound image on the third intermediate data D3 in the display terminal 3.

It is described that the data selection unit 15 selects the ultrasound image data as the data to be output to the display terminal 3 in a case where the computing power determination unit 37 determines that the computing power of the display terminal 3 is the low computing power, selects the first intermediate data D1 as the data to be output to the display terminal 3 in a case where the computing power of the display terminal 3 is determined to be the high computing power, and selects the second intermediate data D2 as the data to be output to the display terminal 3 in a case where the computing power of the display terminal 3 is determined to be the ultra-high computing power. However, a correspondence relationship between the computing power of the display terminal 3 determined by the computing power determination unit 37 and the data to be output to the display terminal 3 may be set in advance by, for example, the input operation of the user through the input device 40.

It is described that the computing power determination unit 37 classifies the computing power of the display terminal 3 into three grades of the low computing power, the high computing power, and the ultra-high computing power. However, for example, the computing power determination unit 37 can also classify the computing power of the display terminal 3 into two grades of the low computing power and the high computing power. In this case, the data selection unit 15 can select the ultrasound image data as the data to be output to the display terminal 3 in a case where the computing power of the display terminal 3 is determined to be the low computing power, for example. Further, the data selection unit 15 can select any one of the first intermediate data D1, the second intermediate data D2, or the third intermediate data D3 as the data to be output to the display terminal 3 in a case where the computing power of the display terminal 3 is determined to be the high computing power, for example.

Further, the computing power determination unit 37 can also classify the computing power of the display terminal 3 into four or more grades, for example.

It is described that the down-sampling units 56 and 61 change the number of samples of the intermediate data for generating the ultrasound image data according to the computing power of the display terminal 3. However, the down-sampling units 56 and 61 can also change a bit width of the intermediate data for generating the ultrasound image data. In this case, the down-sampling units 56 and 61 can narrow the bit width of the complex data, which is digital data, as the computing power of the display terminal 3 determined by the computing power determination unit 37 is lower and widely maintain the bit width of the complex data as the computing power of the display terminal 3 determined by the computing power determination unit 37 is higher. Accordingly, it is possible to reduce the power consumption in the ultrasound probe 2 and the display terminal 3.

It is described that the data selection unit 15 selects any one of the ultrasound image data, the first intermediate data D1, or the second intermediate data D2 as the data to be output to the display terminal 3. However, the data selection unit 15 can also select, for example, intermediate data generated during the generation of the ultrasound image data by the image generation unit 14 of the ultrasound probe 2 as the data to be output to the display terminal 3. Even in this case, it is possible to cause the display terminal to perform the processing according to the computing power of the display terminal 3 connected to the ultrasound probe 2.

In the first embodiment, an example is described in which the B-mode image data is generated. However, for example, color Doppler image data, pulse Doppler image data, so-called motion mode (M mode) image data, or so-called elastography image (elastic image) data may be generated, instead of the B-mode image data. Further, the ultrasound image data may be generated in a state where a so-called contrast agent is administered to the subject.

It is described that the number of samples is thinned out by the down-sampling unit 56 from the complex data generated by the orthogonal detection unit 55 in the reception circuit 13 and then the complex data is transmitted to the image generation unit 14 as the third intermediate data D3. However, the complex data generated by the orthogonal detection unit 55 can be directly transmitted to the image generation unit 14 as, for example, fourth intermediate data without via the down-sampling unit 56. In this case, the image generation unit 14 can generate the ultrasound image data such as the B-mode image data using the complex data directly transmitted from the orthogonal detection unit 55.

Further, also in the image generation unit 32, the complex data generated by the orthogonal detection unit 60 can be directly transmitted to the B-mode image data creation unit 62 as, for example, fifth intermediate data without via the down-sampling unit 61, as in the reception circuit 13. In this case, the B-mode image data creation unit 62 can generate the B-mode image data using the complex data directly transmitted from the orthogonal detection unit 60.

In the flowchart shown in FIG. 6, the processing of step S1 of determining the computing power of the display terminal 3 is performed and then the processing of step S2 of generating the ultrasound image data is performed. However, the processing of step S1 may be performed before step S3 and may be performed after step S2, for example.

Second Embodiment

In the first embodiment, the computing power determination unit 37 and the processing control unit 38 are provided in the display terminal 3, but may be provided in the ultrasound probe 2.

Figure 7:
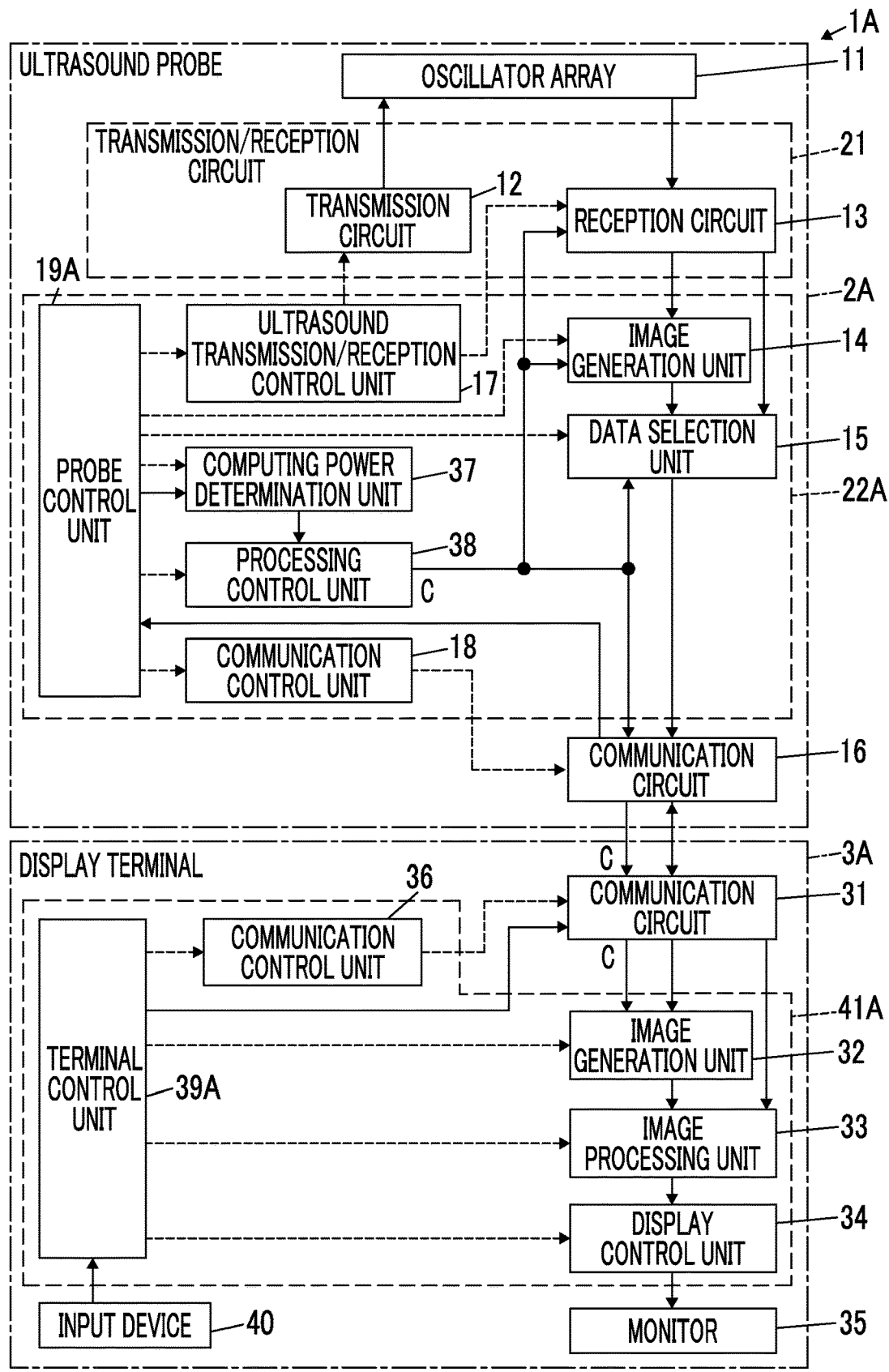
FIG. 7 is a block diagram showing a configuration of an ultrasound system according to a second embodiment of the present invention.

FIG. 7 shows a configuration of an ultrasound system 1A according to a second embodiment. In the ultrasound system 1A, an ultrasound probe 2A is provided instead of the ultrasound probe 2 and a display terminal 3A is provided instead of the display terminal 3 in the ultrasound system 1 of the first embodiment shown in FIGS. 1 and 2.

In the ultrasound probe 2A, the computing power determination unit 37 and the processing control unit 38 are added and a probe control unit 19A is provided instead of the probe control unit 19 in the ultrasound probe 2 according to the first embodiment.

In the ultrasound probe 2A, the probe control unit 19A is connected to the communication circuit 16. Further, the computing power determination unit 37 is connected to the probe control unit 19A. Further, the processing control unit 38 is connected to the computing power determination unit 37 and the probe control unit 19A. Further, the reception circuit 13, the data selection unit 15, the image generation unit 14, and the communication circuit 16 are connected to the processing control unit 38.

Further, a processor 22A for the ultrasound probe 2A is configured by the data selection unit 15, the image generation unit 14, the ultrasound transmission/reception control unit 17, the communication control unit 18, the probe control unit 19A, the computing power determination unit 37, and the processing control unit 38.

In the display terminal 3A, the computing power determination unit 37 and the processing control unit 38 are removed and a terminal control unit 39A is provided instead of the terminal control unit 39 in the display terminal 3 of the first embodiment. Further, a processor 41A for the display terminal 3A is configured by the image generation unit 32, the image processing unit 33, the display control unit 34, the communication control unit 36, and the terminal control unit 39A.

The computing power determination unit 37 of the ultrasound probe 2A receives information about the computing power of the display terminal 3A from the terminal control unit 39A of the display terminal 3A via the communication circuit 31 of the display terminal 3A and the communication circuit 16 and the probe control unit 19A of the ultrasound probe 2A to determine the computing power of the display terminal 3A to which the ultrasound probe 2A is connected.

As in the computing power determination unit 37 according to the first embodiment, the computing power determination unit 37 according to the second embodiment can determine the computing power of the display terminal 3A based on, for example, the processing time of the test program, the model number of the central processing unit of the display terminal 3A, and the memory amount of the display terminal 3.

The processing control unit 38 generates the control signal C based on the computing power of the display terminal 3A determined by the computing power determination unit 37 and transmits the generated control signal C to the reception circuit 13, the data selection unit 15, the image generation unit 14, and the communication circuit 16. The control signal C transmitted to the communication circuit 16 of the ultrasound probe 2A is transmitted from the communication circuit 16 to the communication circuit 31 of the display terminal 3A and further transmitted to the image generation unit 32.

For example, the data selection unit 15 can select data to be output to the display terminal 3A from any one of the ultrasound image data, the first intermediate data D1, or the second intermediate data D2 according to the computing power of the display terminal 3A determined by the computing power determination unit 37, in accordance with the control signal C of the processing control unit 38, in the same manner as in the data selection unit 15 according to the first embodiment.

In a case where the computing power determination unit 37 determines that the computing power of the display terminal 3A is the low computing power, the data selection unit 15 selects the ultrasound image data as the data to be output to the display terminal 3A and transmits the ultrasound image data generated by the image generation unit 14 to the communication circuit 31 of the display terminal 3A via the communication circuit 16. The ultrasound image data transmitted to the display terminal 3A is subjected to the predetermined processing by the image processing unit 33 and the display control unit 34, and the ultrasound image corresponding to the ultrasound image data is displayed on the monitor 35.

In a case where the computing power determination unit 37 determines that the computing power of the display terminal 3A is the high computing power, the data selection unit 15 selects the first intermediate data D1 as the data to be output to the display terminal 3A and transmits the first intermediate data D1 from the communication circuit 16 of the ultrasound probe 2A to the communication circuit 31 of the display terminal 3A. In this case, the image generation unit 32 of the display terminal 3A generates the ultrasound image data based on the first intermediate data D1. The ultrasound image data generated in this manner is subjected to the predetermined processing by the image processing unit 33 and the display control unit 34, and the ultrasound image corresponding to the ultrasound image data is displayed on the monitor 35.

In a case where the computing power determination unit 37 determines that the computing power of the display terminal 3A is the ultra-high computing power, the data selection unit 15 selects the second intermediate data D2 as the data to be output to the display terminal 3A and transmits the second intermediate data D2 from the communication circuit 16 of the ultrasound probe 2A to the communication circuit 31 of the display terminal 3A. In this case, the image generation unit 32 of the display terminal 3A generates the ultrasound image data based on the second intermediate data D2. The ultrasound image data generated in this manner is subjected to the predetermined processing by the image processing unit 33 and the display control unit 34, and the ultrasound image corresponding to the ultrasound image data is displayed on the monitor 35.

From the above, with the ultrasound system 1A according to the second embodiment of the present invention, in the same manner as in the first embodiment, in a case where the computing power determination unit 37 determines that the computing power of the display terminal 3 is, for example, the high computing power or the ultra-high computing power, the data selection unit 15 outputs the first intermediate data D1 or the second intermediate data D2 to the display terminal 3 based on the control signal C output from the processing control unit 38. Therefore, it is possible to use various types of display terminals and to cause the display terminal 3A to perform the processing according to the computing power of the display terminal 3A connected to the ultrasound probe 2A.

Third Embodiment

In the first embodiment, an example in which one type of image data is generated as the ultrasound image data is described. However, in a case where a plurality of types of image data are generated as the ultrasound image data, data to be output from the ultrasound probe 2 to the display terminal 3 can be selected in consideration of the type of image data.

Figure 8:
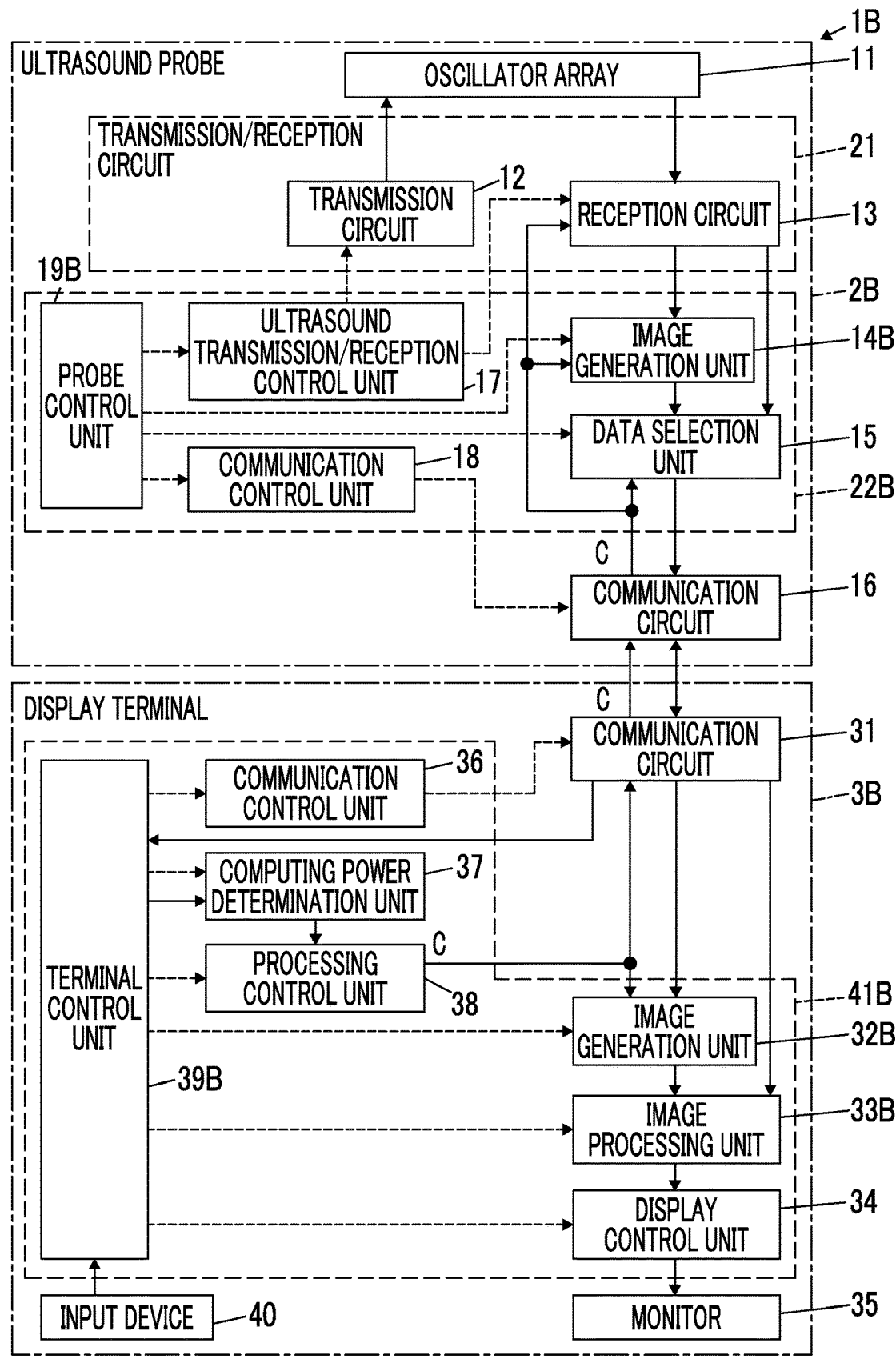
FIG. 8 is a block diagram showing a configuration of an ultrasound system according to a third embodiment of the present invention.

FIG. 8 shows a configuration of an ultrasound system 1B according to a third embodiment. In the ultrasound system 1B, an ultrasound probe 2B is provided instead of the ultrasound probe 2 and a display terminal 3B is provided instead of the display terminal 3 in the ultrasound system 1 of the first embodiment shown in FIGS. 1 and 2.

The ultrasound probe 2B according to the third embodiment, an image generation unit 14B is provided instead of the image generation unit 14 and a probe control unit 19B is provided instead of the probe control unit 19 in the ultrasound probe 2 according to the first embodiment. In the ultrasound probe 2B, a processor 22B for the ultrasound probe 2B is configured by the data selection unit 15, the image generation unit 14B, the ultrasound transmission/reception control unit 17, the communication control unit 18, and the probe control unit 19B.

The display terminal 3B according to the third embodiment, an image generation unit 32B is provided instead of the image generation unit 32, an image processing unit 33B is provided instead of the image processing unit 33, and a terminal control unit 39B is provided instead of the terminal control unit 39 in the display terminal 3 according to the first embodiment. In the display terminal 3B, a processor 41B for the display terminal 3B is configured by the image generation unit 32B, the image processing unit 33B, the display control unit 34, the communication control unit 36, the computing power determination unit 37, the processing control unit 38, and the terminal control unit 39B.

Figure 9:
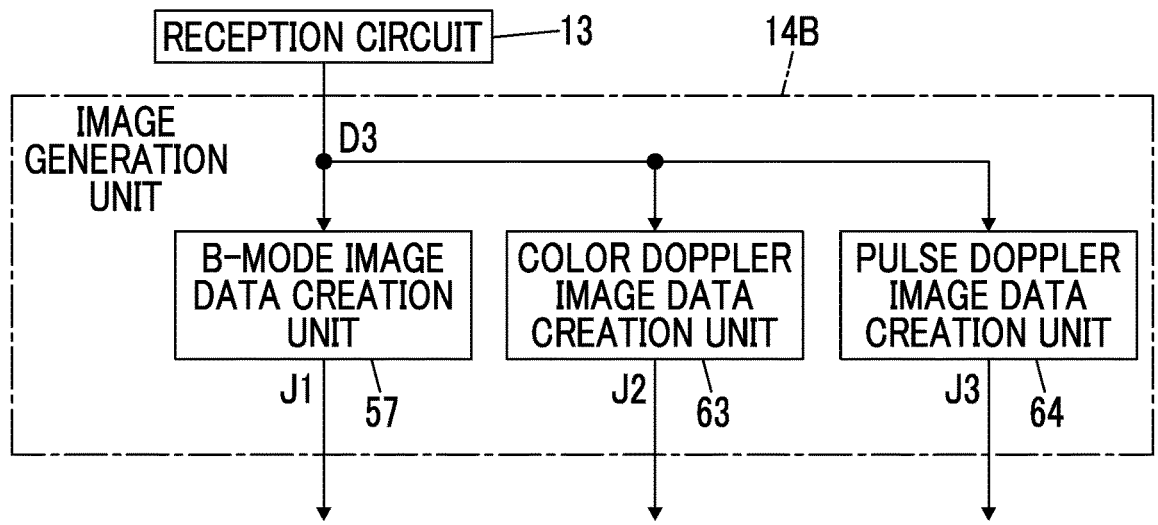
FIG. 9 is a block diagram showing a configuration of an image generation unit of an ultrasound probe according to the third embodiment of the present invention.

The image generation unit 14B of the ultrasound probe 2B generates any one of the B-mode image data, the color Doppler image data, or the pulse Doppler image data from the third intermediate data D3 in accordance with the control signal C output from the processing control unit 38. As shown in FIG. 9, the image generation unit 14B includes the B-mode image data creation unit 57, a color Doppler image data creation unit 63, and a pulse Doppler image data creation unit 64.

The B-mode image data creation unit 57 is identical to the B-mode image data creation unit 57 according to the first embodiment and creates B-mode image data J1 based on the third intermediate data D3.

The color Doppler image data creation unit 63 performs frequency analysis using so-called Fast Fourier transform (FFT) or so-called autocorrelation calculation on the third intermediate data D3 which is complex data subjected to orthogonal detection processing to acquire a Doppler shift frequency representing movement of blood flow or tissue in the subject and converts the acquired Doppler shift frequency into color information to create color Doppler image data J2. The color Doppler image data creation unit 63 stores, for example, a relationship between the Doppler shift frequency and the color information in advance and can convert the Doppler shift frequency into the color information using this relationship.

The pulse Doppler image data creation unit 64 performs the frequency analysis on the third intermediate data D3, which is the complex data subjected to the orthogonal detection processing, by using the Fast Fourier transform to generate a plurality of spectral signals and represents magnitude of each frequency component in terms of brightness while aligning the plurality of spectral signals on a time axis to create pulse Doppler image data J3.

Figure 10:
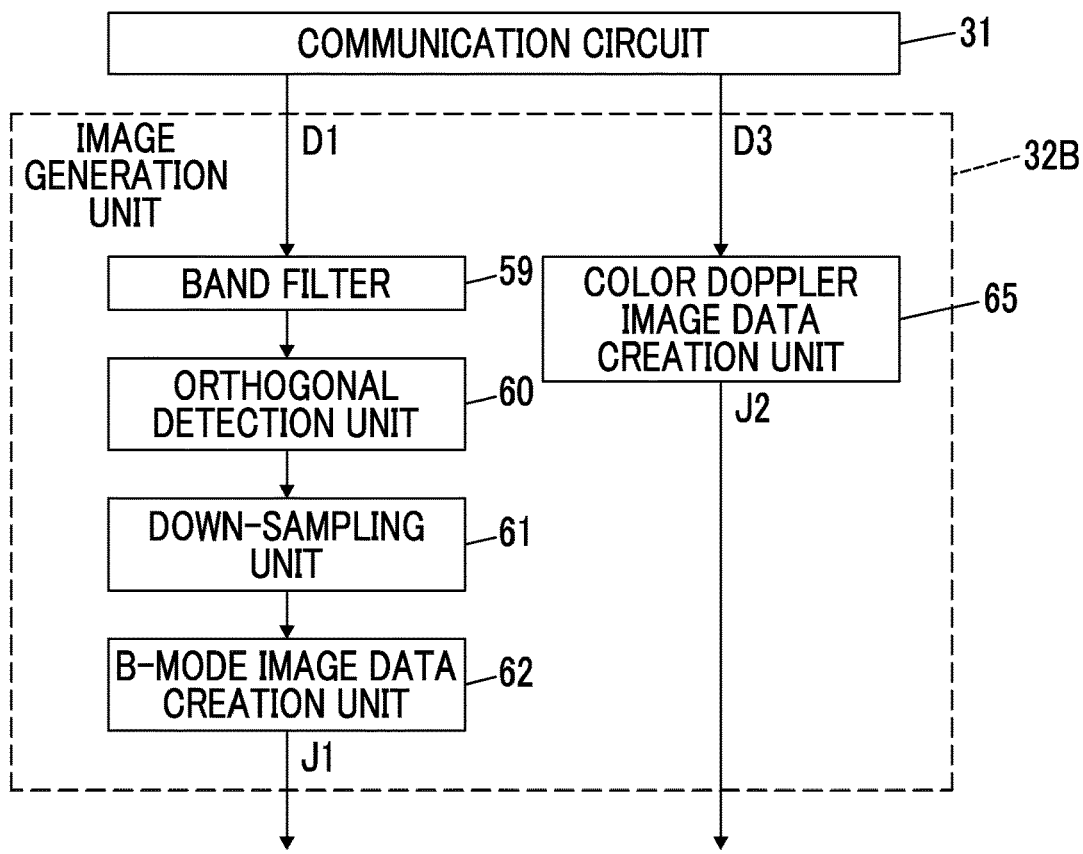
FIG. 10 is a block diagram showing a configuration of an image generation unit of a display terminal according to the third embodiment of the present invention.

The image generation unit 32B of the display terminal 3B generates the B-mode image data J1 from the first intermediate data D1 and the color Doppler image data J2 from the third intermediate data D3 in accordance with the control signal C output from the processing control unit 38. As shown in FIG. 10, the image generation unit 32B includes the band filter 59, the orthogonal detection unit 60, the down-sampling unit 61, and the B-mode image data creation unit 62, which are sequentially connected in series to the communication circuit 31, and the color Doppler image data creation unit 65 connected to the communication circuit 31.

The band filter 59, the orthogonal detection unit 60, and the down-sampling unit 61 of the image generation unit 32B of the display terminal 3B are identical to the band filter 59, the orthogonal detection unit 60, and the down-sampling unit 61 according to the first embodiment shown in FIG. 5. Further, the color Doppler image data creation unit 65 of the image generation unit 32B of the display terminal 3B is identical to the color Doppler image data creation unit 63 of the image generation unit 14B of the ultrasound probe 2B shown in FIG. 9.

The image processing unit 33B of the display terminal 3B converts the B-mode image data J1, the color Doppler image data J2, and the pulse Doppler image data J3 transmitted from the communication circuit 31 and the image generation unit 32B into image signals according to a normal television signal scanning method, performs various pieces of necessary image processing such as gradation processing on the converted data, and then transmits the pieces of data to the display control unit 34.

Figure 11:
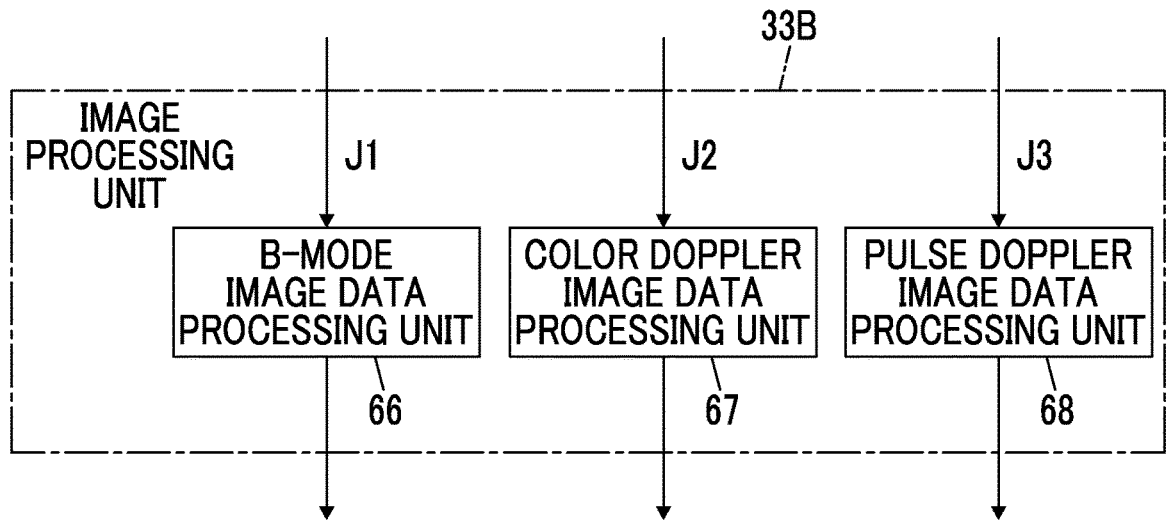
FIG. 11 is a block diagram showing a configuration of an image processing unit according to the third embodiment of the present invention.

As shown in FIG. 11, the image processing unit 33 includes a B-mode image data processing unit 66 that performs various types of processing on the B-mode image data J1, a color Doppler image data processing unit 67 that performs various types of processing on the color Doppler image data J2, and a pulse Doppler image data processing unit 68 that performs various types of processing on the pulse Doppler image data J3.

The data selection unit 15 selects the data, which is output from the ultrasound probe 2B to the display terminal 3B, from among the B-mode image data J1, the color Doppler image data J2, the pulse Doppler image data J3, the first intermediate data D1, and the third intermediate data D3, based on the computing power of the display terminal 3B determined by the computing power determination unit 37 and the type of image data generated by the ultrasound system 1B, in accordance with the control signal C output by the processing control unit 38. A combination of the computing power of the display terminal 3B, the type of image data generated by the ultrasound system 1B, and the data to be output to the display terminal 3B can be set in advance by, for example, the input operation by the user via the input device 40.

Next, an operation of the ultrasound system 1B according to the third embodiment will be described with reference to a flowchart of FIG. 12. In the following description of the operation, an example will be described in which the computing power determination unit 37 classifies the computing power of the display terminal 3B into two grades of the low computing power and the high computing power and any one of a B mode to generate the B-mode image data J1, a color Doppler mode to generate the color Doppler image data J2, or a pulse Doppler mode to generate the pulse Doppler image data J3 is set as an image mode to generate the image data by the input operation of the user via the input device 40.

First, in step S11, any one of the B mode, the color Doppler mode, and the pulse Doppler mode is selected as the image mode by the input operation of the user via the input device 40.

Figure 13:
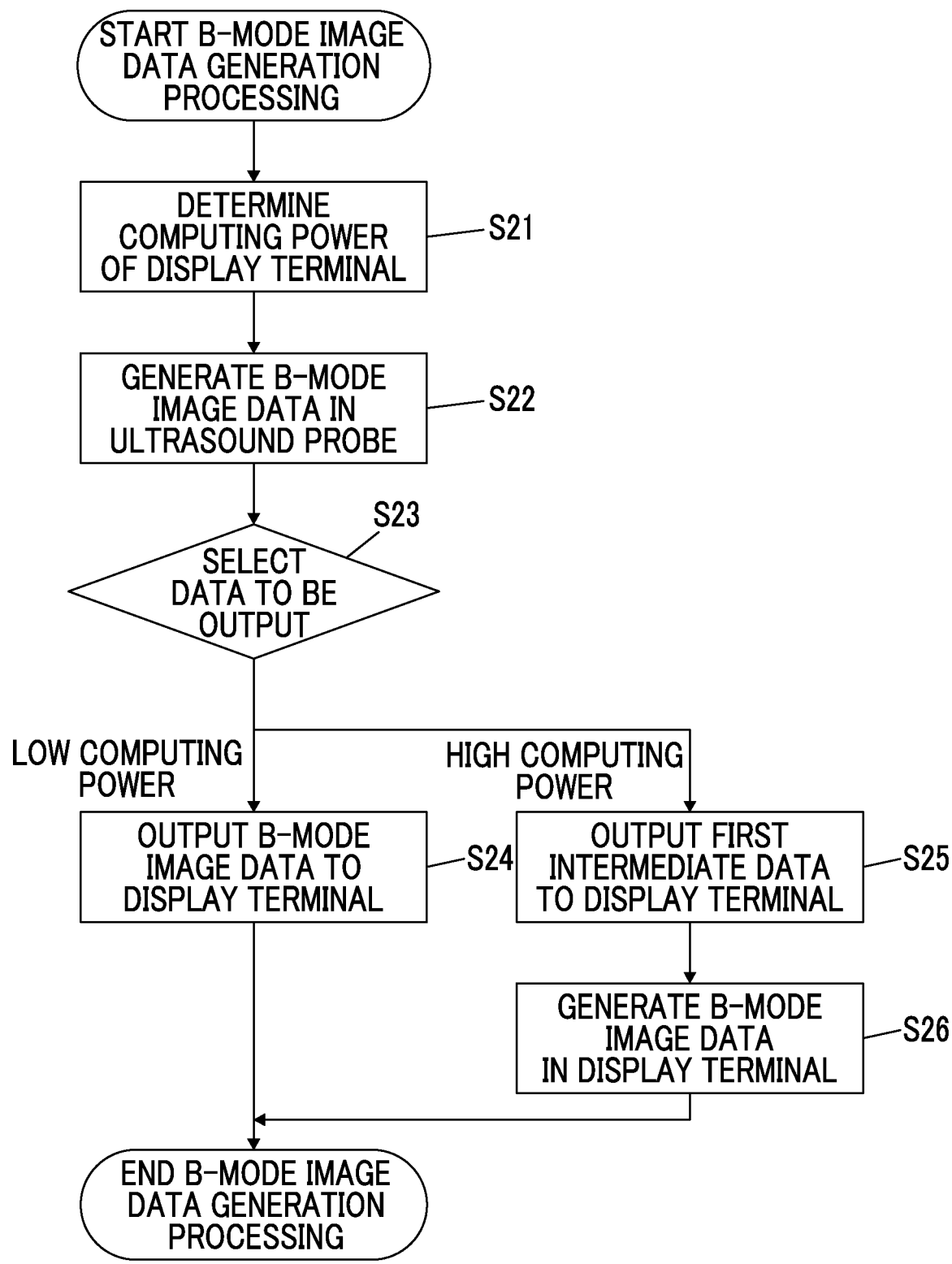
FIG. 13 is a flowchart showing an operation of B-mode image data generation of the ultrasound system according to the third embodiment of the present invention.

In a case where the B mode is selected in step S11, the processing proceeds to step S12. In step S12, the B-mode image data J1 is generated. B-mode image data generation processing of Step S12 will be described with reference to a flowchart of FIG. 13. In a case where the B-mode image data generation processing is started, processing of step S21 is first performed as shown in FIG. 13.

In step S21, the computing power determination unit 37 classifies the computing power of the display terminal 3B into any one of the low computing power or the high computing power in the same manner as in step S1 of the flowchart of FIG. 6.

In step S22, the B-mode image data J1 is generated in the ultrasound probe 2B. In this case, the first intermediate data D1, the second intermediate data D2, and the third intermediate data D3 are generated in the reception circuit 13 in the same manner as in step S2 in FIG. 6. The first intermediate data D1 is transmitted to the data selection unit 15, and the third intermediate data D3 is transmitted to the image generation unit 14B. The image generation unit 14B generates the B-mode image data J1 based on the third intermediate data D3 by the B-mode image data creation unit 57 in accordance with the control signal C output from the processing control unit 38.

In step S23, the data selection unit 15 selects the data to be output to the display terminal 3B, according to the computing power of the display terminal 3B, among the B-mode image data J1 generated by the image generation unit 14B of the ultrasound probe 2B and the first intermediate data D1 generated in the reception circuit 13, in accordance with the control signal C.

In a case where the computing power of the display terminal 3B is determined to be the low computing power in step S21, the data selection unit 15 selects the B-mode image data J1 as the data to be output to the display terminal 3B in step S23. In this case, the processing proceeds to step S24.

In step S24, the data selection unit 15 transmits the B-mode image data J1 generated by the image generation unit 14B of the ultrasound probe 2B from the communication circuit 16 of the ultrasound probe 2B to the communication circuit 31 of the display terminal 3B to output the B-mode image data J1 to the display terminal 3B.

In a case where the computing power of the display terminal 3B is determined to be the high computing power in step S21, the data selection unit 15 selects the first intermediate data D1 as the data to be output to the display terminal 3B in step S23. In this case, the processing proceeds to step S25.

In step S25, the data selection unit 15 transmits the first intermediate data D1 generated in step S22 from the communication circuit 16 of the ultrasound probe 2B to the communication circuit 31 of the display terminal 3B to output the first intermediate data D1 to the display terminal 3B.

In step S26, the B-mode image data is generated in the display terminal 3B in the same manner as in step S7 in FIG. 6. In this case, the image generation unit 32B of the display terminal 3B generates the B-mode image data based on the first intermediate data D1 by the band filter 59, the orthogonal detection unit 60, the down-sampling unit 61, and the B-mode image data creation unit 62, in accordance with the control signal C output from the processing control unit 38.

In a case where the processing of step S24 or the processing of step S26 is completed in this manner, the processing of step S12 representing the B-mode image data generation processing is completed.

In step S15 following step S12, the B-mode image data J1 is subjected to the predetermined processing by the B-mode image data processing unit 66 and the display control unit 34 of the image processing unit 33B, and then a B mode image based on the B-mode image data J1 is displayed on the monitor 35.

Figure 14:
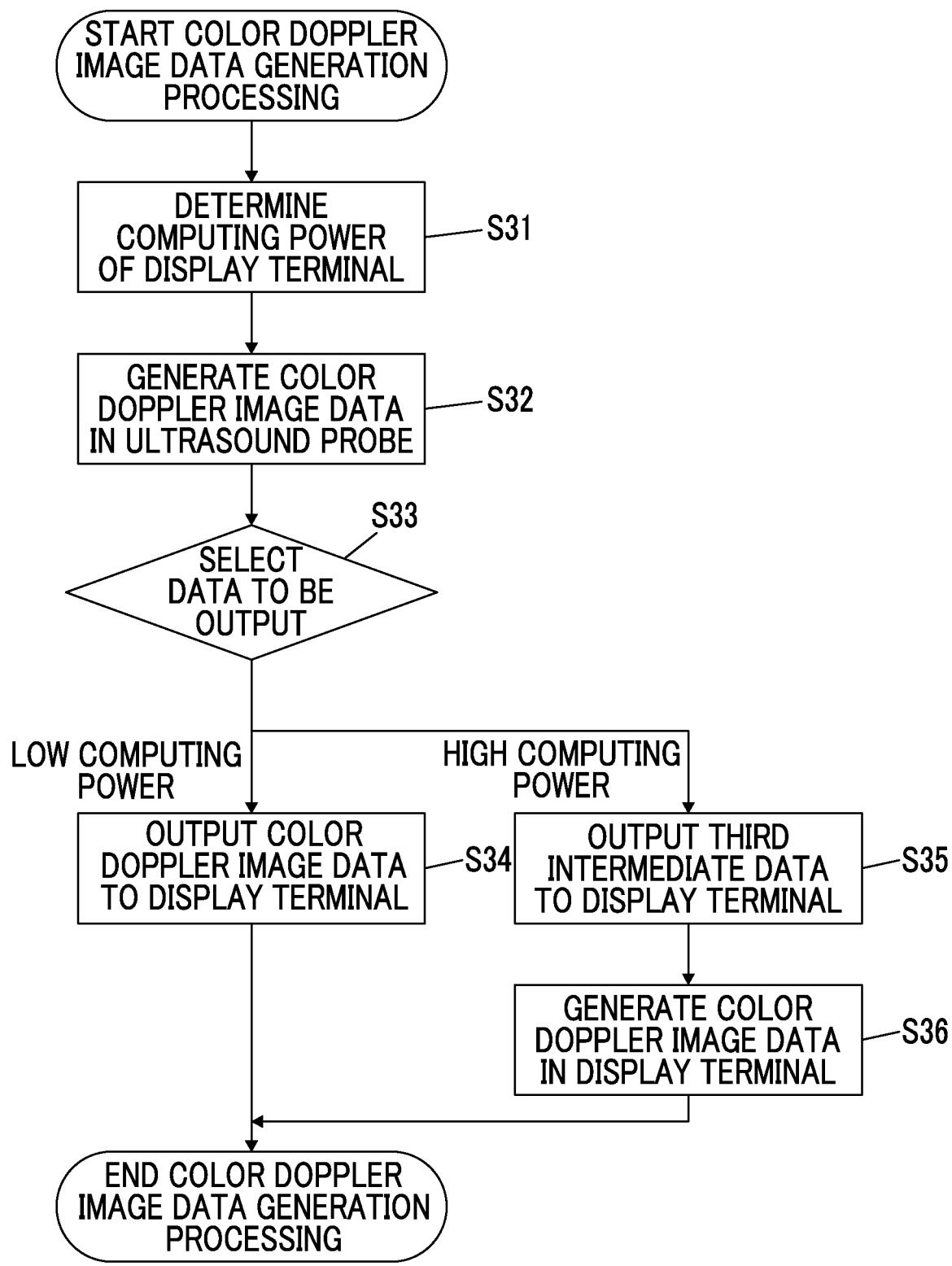
FIG. 14 is a flowchart showing an operation of color Doppler image data generation of the ultrasound system according to the third embodiment of the present invention.

In a case where the color Doppler mode is selected in step S11, the processing proceeds to step S13. In step S13, the color Doppler image data J2 is generated. Color Doppler image data generation processing of Step S13 will be described with reference to a flowchart of FIG. 14. In a case where the color Doppler image data generation processing is started, processing of step S31 is first performed as shown in FIG. 14.

In step S31, the computing power determination unit 37 classifies the computing power of the display terminal 3B into any one of the low computing power or the high computing power in the same manner as in step S1 of the flowchart of FIG. 6.

In step S33, the color Doppler image data J2 is generated in the ultrasound probe 2B. In this case, the first intermediate data D1, the second intermediate data D2, and the third intermediate data D3 are generated in the reception circuit 13 in the same manner as in step S2 in FIG. 6. The first intermediate data D1 is transmitted to the data selection unit 15, and the third intermediate data D3 is transmitted to the image generation unit 14B. The image generation unit 14B generates the color Doppler image data J2 based on the third intermediate data D3 by the color Doppler image data creation unit 63 in accordance with the control signal C output from the processing control unit 38.

In step S33, the data selection unit 15 selects the data to be output to the display terminal 3B, according to the computing power of the display terminal 3B, among the color Doppler image data J2 generated by the image generation unit 14B of the ultrasound probe 2B and the third intermediate data D3 generated in the reception circuit 13, in accordance with the control signal C.

In a case where the computing power of the display terminal 3B is determined to be the low computing power in step S31, the data selection unit 15 selects the color Doppler image data J2 as the data to be output to the display terminal 3B in step S33. In this case, the processing proceeds to step S34.

In step S34, the data selection unit 15 transmits the color Doppler image data J2 generated by the image generation unit 14B of the ultrasound probe 2B from the communication circuit 16 of the ultrasound probe 2B to the communication circuit 31 of the display terminal 3B to output the color Doppler image data J2 to the display terminal 3B.

In a case in which the computing power of the display terminal 3B is determined to be the high computing power in step S31, the data selection unit 15 selects the third intermediate data D3 as the data to be output to the display terminal 3B in step S33. In this case, the processing proceeds to step S35.

In step S35, the data selection unit 15 transmits the third intermediate data D3 generated in step S32 from the communication circuit 16 of the ultrasound probe 2B to the communication circuit 31 of the display terminal 3B to output the third intermediate data D3 to the display terminal 3B.

In step S36, the color Doppler image data is generated in the display terminal 3B. In this case, the image generation unit 32B of the display terminal 3B generates the color Doppler image data based on the third intermediate data D3 by the color Doppler image data creation unit 65 in accordance with the control signal C output from the processing control unit 38.

In a case where the processing of step S34 or the processing of step S36 is completed in this manner, the processing of step S13 representing the color Doppler image data generation processing is completed.

In step S15 following step S13, the color Doppler image data J2 is subjected to the predetermined processing by the color Doppler image data processing unit 67 and the display control unit 34 of the image processing unit 33B, and then a color Doppler image based on the color Doppler image data J2 is displayed on the monitor 35.

Figure 15:
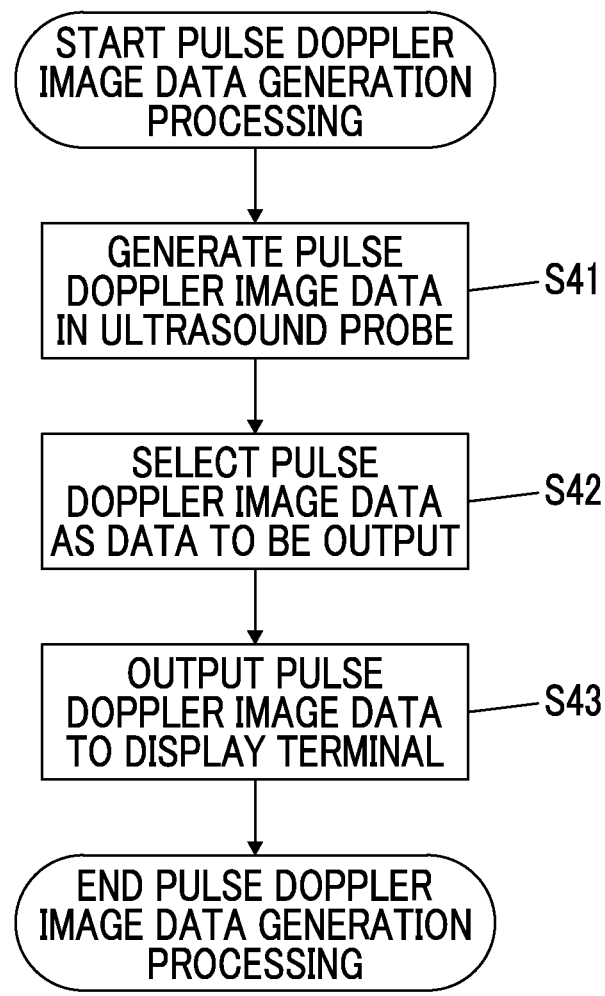
FIG. 15 is a flowchart showing an operation of pulse Doppler image data generation of the ultrasound system according to the third embodiment of the present invention.

In a case where the pulse Doppler mode is selected in step S11, the processing proceeds to step S14. In step S14, the pulse Doppler image data J3 is generated. Pulse image data generation processing of step S14 will be described with reference to a flowchart of FIG. 15. In a case where the pulse Doppler image data generation processing is started, processing of step S41 is first performed as shown in FIG. 15.

In step S41, the pulse Doppler image data J3 is generated in the ultrasound probe 2B. In this case, the reception circuit 13 generates the first intermediate data D1, the second intermediate data D2, and the third intermediate data D3. The first intermediate data D1 is transmitted to the data selection unit 15, and the third intermediate data D3 is transmitted to the image generation unit 14B. The image generation unit 14B generates the pulse Doppler image data J3 by the pulse Doppler image data creation unit 64 in accordance with the control signal C output from the processing control unit 38.

In step S42, the data selection unit 15 selects the pulse Doppler image data generated in step S41 as the data to be output to the display terminal 3B regardless of the computing power of the display terminal 3B. This is because, in a case where the intermediate data is transmitted from the ultrasound probe 2B to the display terminal 3B in generating the pulse Doppler image data, a loss of the intermediate data due to communication failure between the ultrasound probe 2B and the display terminal 3B may be noise in the pulse Doppler image data and thus deteriorate image quality.

In step S43, the pulse Doppler image data J3 generated by the image generation unit 14B of the ultrasound probe 2B is transmitted from the communication circuit 16 of the ultrasound probe 2B to the communication circuit 31 of the display terminal 3B to output the pulse Doppler image data J3 to the display terminal 3B.

In a case where the processing of step S43 is completed in this manner, the processing of step S14 representing the pulse Doppler image data generation processing is completed.

In step S15 following step S14, the pulse Doppler image data J3 is subjected to the predetermined processing by the pulse Doppler image data processing unit 68 and the display control unit 34 of the image processing unit 33B, and then a pulse Doppler image based on the pulse Doppler image data J3 is displayed on the monitor 35.

Figure 12:
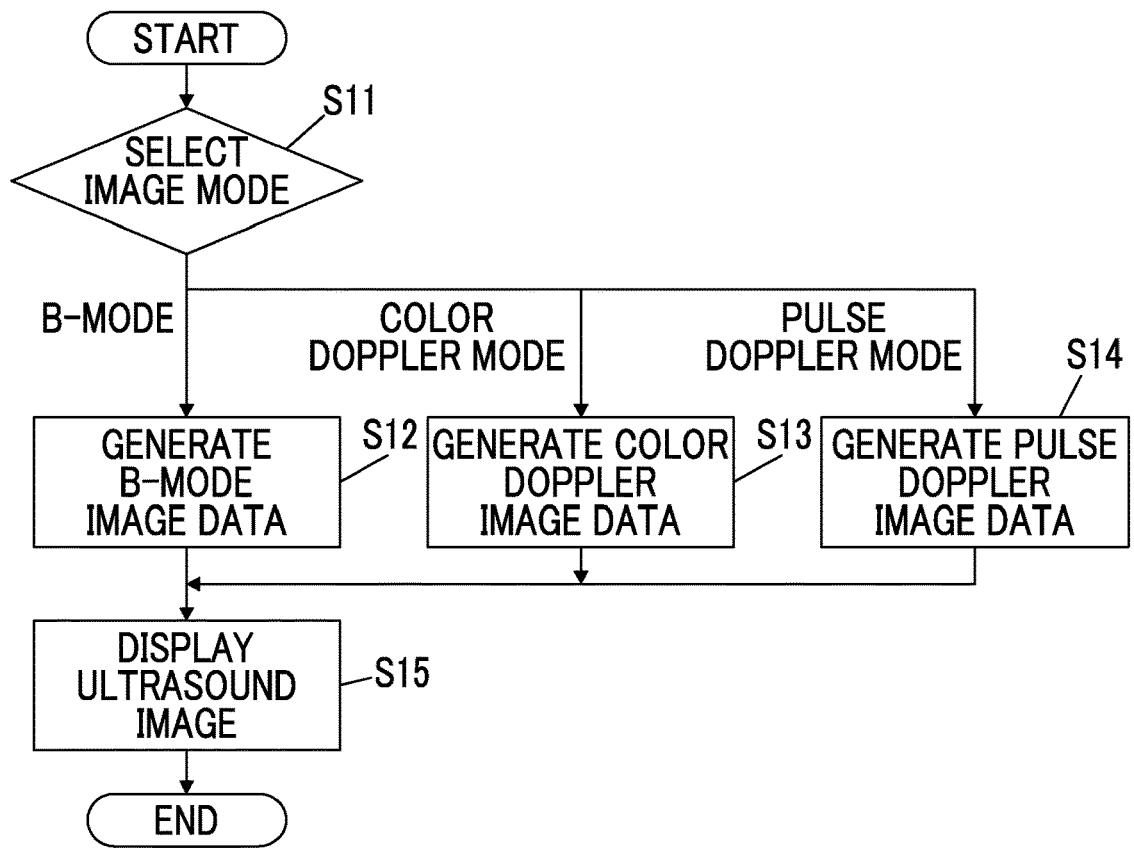
FIG. 12 is a flowchart showing an operation of the ultrasound system according to the third embodiment of the present invention.

In a case where the processing of step S15 is completed in this manner, the operation of the ultrasound system 1B according to FIG. 12 is completed.

From the above, with the ultrasound system 1B according to the third embodiment of the present invention, the data selection unit 15 selects the data to be output to the display terminal 3B in consideration of not only the computing power of the display terminal 3B but also the set image mode. Therefore, it is possible to use various types of display terminals and to cause the display terminal 3B to perform the processing according to the computing power of the display terminal 3B connected to the ultrasound probe 2B while performing appropriate processing for each image mode.

It is described that the aspect of the third embodiment is applied to the first embodiment. However, the same can be applied even in a case where the computing power determination unit 37 and the processing control unit 38 are included in the ultrasound probe 2B, as in the second embodiment.

EXPLANATION OF REFERENCES

- 1, 1A, 1B: ultrasound system
- 2, 2A, 2B: ultrasound probe
- 3, 3A, 3B, 4, 5: display terminal
- 11: oscillator array
- 12: transmission circuit
- 13: reception circuit
- 14, 14B, 32, 32B: image generation unit
- 15: data selection unit
- 16, 31: communication circuit
- 17: ultrasound transmission/reception control unit
- 18, 36: communication control unit
- 19, 19A, 19B: probe control unit
- 21: transmission/reception circuit
- 22, 22A, 22B, 41, 41A, 41B: processor
- 33, 33B: image processing unit
- 34: display control unit
- 35: monitor
- 37: computing power determination unit
- 38: processing control unit
- 39, 39A, 39B: terminal control unit
- 40: input device
- 51: amplification unit
- 52: AD conversion unit
- 53, 58: beamformer
- 54, 59: band filter
- 55, 60: orthogonal detection unit
- 56, 61: down-sampling unit
- 57, 62: B-mode image data creation unit
- 63, 65: color Doppler image data creation unit
- 64: pulse Doppler image data creation unit
- 66: B-mode image data processing unit
- 67: color Doppler image data processing unit
- 68: pulse Doppler image data processing unit

What is claimed is:

1. An ultrasound system comprising:
   a plurality of display terminals each having a monitor, where types of the plurality of display terminals are different from each other; and
   an ultrasound probe connectable to any of the plurality of types of display terminals,
   wherein the ultrasound probe includes
   an oscillator array,
   a transmission circuit configured to transmit an ultrasound wave from the oscillator array,
   a reception circuit configured to generate a plurality of intermediate data based on a reception signal output from the oscillator array that has received an ultrasound echo, where the plurality of intermediate data are generated in chronological order and types of the plurality of intermediate data are different from each other,
   a processor configured to
   generate ultrasound image data based on a sound ray signal which is an intermediate data generated most recently in chronological order among the plurality of intermediate data,
   detect one display terminal connected with the ultrasound probe among the plurality of display terminals,
   classify a grade of a processing time required for processing a predetermined test program by the one display terminal among a plurality of grades of the processing time classified by using a plurality of processing time threshold values, and
   select one data corresponding to the grade among the ultrasound image data and the plurality of intermediate data, as data to be output to the one display terminal,
   wherein the one display terminal is configured to display an ultrasound image on the monitor based on the one data.

2. The ultrasound system according to claim 1,
   wherein the plurality of intermediate data includes a digitalized signal generated by digitalizing the reception signal in the reception circuit.

3. The ultrasound system according to claim 1,
   wherein the plurality of intermediate data includes complex data after orthogonal detection generated by the reception circuit.

4. The ultrasound system according to claim 1,
   wherein the reception circuit is configured to change the number of samples or a bit width of the one data according to the grade before outputting the one data to the one display terminal.

5. The ultrasound system according to claim 2,
   wherein the reception circuit is configured to change the number of samples or a bit width of the one data according to the grade before outputting the one data to the one display terminal.

6. The ultrasound system according to claim 3,
   wherein the reception circuit is configured to change the number of samples or a bit width of the one data according to the grade before outputting the one data to the one display terminal.

7. The ultrasound system according to claim 4,
   wherein the reception circuit is configured to change the bit width of the one data by narrowing the bit width or change the number of the samples of the one data by reducing the number of the samples, as the grade corresponds to a processing time that is longer than one processing time threshold value of the plurality of processing time threshold values.

8. An ultrasound probe connectable to any of a plurality of display terminals, where types of the plurality of display terminals are different from each other, the ultrasound probe comprising:
   an oscillator array;
   a transmission circuit configured to transmit an ultrasound wave from the oscillator array;
   a reception circuit configured to generate a plurality of intermediate data based on a reception signal output from the oscillator array that has received an ultrasound echo, where the plurality of intermediate data are generated in chronological order and types of the plurality of intermediate data are different from each other;

a processor configured to
generate ultrasound image data based on a sound ray signal which is generated most recently in chronological order among the plurality of intermediate data,
detect one display terminal connected to the ultrasound probe among the plurality of display terminals,
classify a grade of a processing time required for processing a predetermined test program by the one display terminal among a plurality of grades of the processing time classified by using a plurality of processing time threshold values, and
select one data corresponding to the grade among the ultrasound image data and the plurality of intermediate data, as data to be output to the one display terminal.

9. A control method of an ultrasound system including a plurality of display terminals each having a monitor and an ultrasound probe connectable to any of the plurality of display terminals, where types of the plurality of display terminals are different from each other, the control method comprising:
in the ultrasound probe,
transmitting, by a transmission circuit of the ultrasound probe, an ultrasound wave from an oscillator array;
generating, by a reception circuit of the ultrasound probe, a plurality of intermediate data based on a reception signal output from the oscillator array that has received an ultrasound echo, where the plurality of intermediate data are generated in chronological order and types of the plurality of intermediate data are different from each other;
generating, by a processor of the ultrasound probe, ultrasound image data based on a sound ray signal which is an intermediate data generated most recently in chronological order among the plurality of intermediate data;
detecting, by the processor of the ultrasound probe, one display terminal connected with the ultrasound probe among the plurality of display terminals;
classifying, by the processor of the ultrasound probe, a grade of a processing time required for processing a predetermined test program by the one display terminal among a plurality of grades of the processing time classified by using a plurality of processing time threshold values; and
selecting, by the processor of the ultrasound probe, one data corresponding to the grade among the ultrasound image data and the plurality of intermediate data, as data to be output to the one display terminal; and
in the one display terminal,
displaying an ultrasound image on a monitor based on the one data.

10. A control method for an ultrasound probe connectable to any of a plurality of display terminals, where types of the plurality of display terminals are different from each other, the control method comprising:
transmitting, by a transmission circuit of the ultrasound probe, an ultrasound wave from an oscillator array;
generating, by a reception circuit of the ultrasound probe, a plurality of intermediate data based on a reception signal output from the oscillator array that has received an ultrasound echo, where the plurality of intermediate data are generated in chronological order and types of the plurality of intermediate data are different from each other;
generating, by a processor of the ultrasound probe, ultrasound image data based on a sound ray signal which is an intermediate data generated most recently in chronological order among the plurality of intermediate data;
detecting, by the processor of the ultrasound probe, one display terminal connected with the ultrasound probe among the plurality of display terminals;
classifying, by the processor of the ultrasound probe, a grade of a processing time required for processing a predetermined test program by the one display terminal among a plurality of grades of the processing time classified by using a plurality of processing time threshold values; and
selecting, by the processor of the ultrasound probe, one data corresponding to the grade among the ultrasound image data and the plurality of intermediate data, as data to be output to the one display terminal.

* * * * *